(12) United States Patent
Hu et al.

(10) Patent No.: US 12,038,561 B2
(45) Date of Patent: Jul. 16, 2024

(54) OPTICAL IMAGING LENS INCLUDING EIGHT LENSES OF +--++-+-, ++-++-+- OR +--+--+- REFRACTIVE POWERS

(71) Applicant: Genius Electronic Optical (Xiamen) Co., Ltd., Fujian (CN)

(72) Inventors: Run Hu, Fujian (CN); Ou Zhou, Fujian (CN)

(73) Assignee: Genius Electronic Optical (Xiamen) Co., Ltd., Fujian (CN)

( * ) Notice: Subject to any disclaimer, the term of this patent is extended or adjusted under 35 U.S.C. 154(b) by 675 days.

(21) Appl. No.: 17/179,411

(22) Filed: Feb. 19, 2021

(65) Prior Publication Data
US 2022/0179173 A1    Jun. 9, 2022

(30) Foreign Application Priority Data
Dec. 9, 2020   (CN) .......................... 202011425837.2

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| | | | |
|---|---|---|---|
| 2021/0157104 A1* | 5/2021 | Jung | G02B 9/64 |
| 2022/0113509 A1* | 4/2022 | Li | G02B 9/64 |

* cited by examiner

*Primary Examiner* — Wen Huang
(74) *Attorney, Agent, or Firm* — Winston Hsu

(57) ABSTRACT

An optical imaging lens includes a first lens element to an eighth lens element, and each lens element has an object-side surface and an image-side surface. An optical axis region of the image-side surface of the first lens element is concave, the third lens element has negative refracting power, and a periphery region of the object-side surface of the third lens element is concave, the sixth lens element has negative refracting power, and an optical axis region of the object-side surface of the sixth lens element is convex, the seventh lens element has positive refracting power, and a periphery region of the object-side surface of the seventh lens element is concave. Lens elements included by the optical imaging lens are only the eight lens elements mentioned above, and the optical imaging lens satisfies the following conditions: |V2−V3|≤5.000, and D12/(G45+G67) ≤4.100.

19 Claims, 12 Drawing Sheets

Field of view 1.0

Longitudinal spherical aberration

Image Height 6.700

Sagittal field curvature

Image Height 6.700

Tangential field curvature

Image Height 6.700

Distortion

Longitudinal spherical aberration

Sagittal field curvature

Tangential field curvature

Distortion

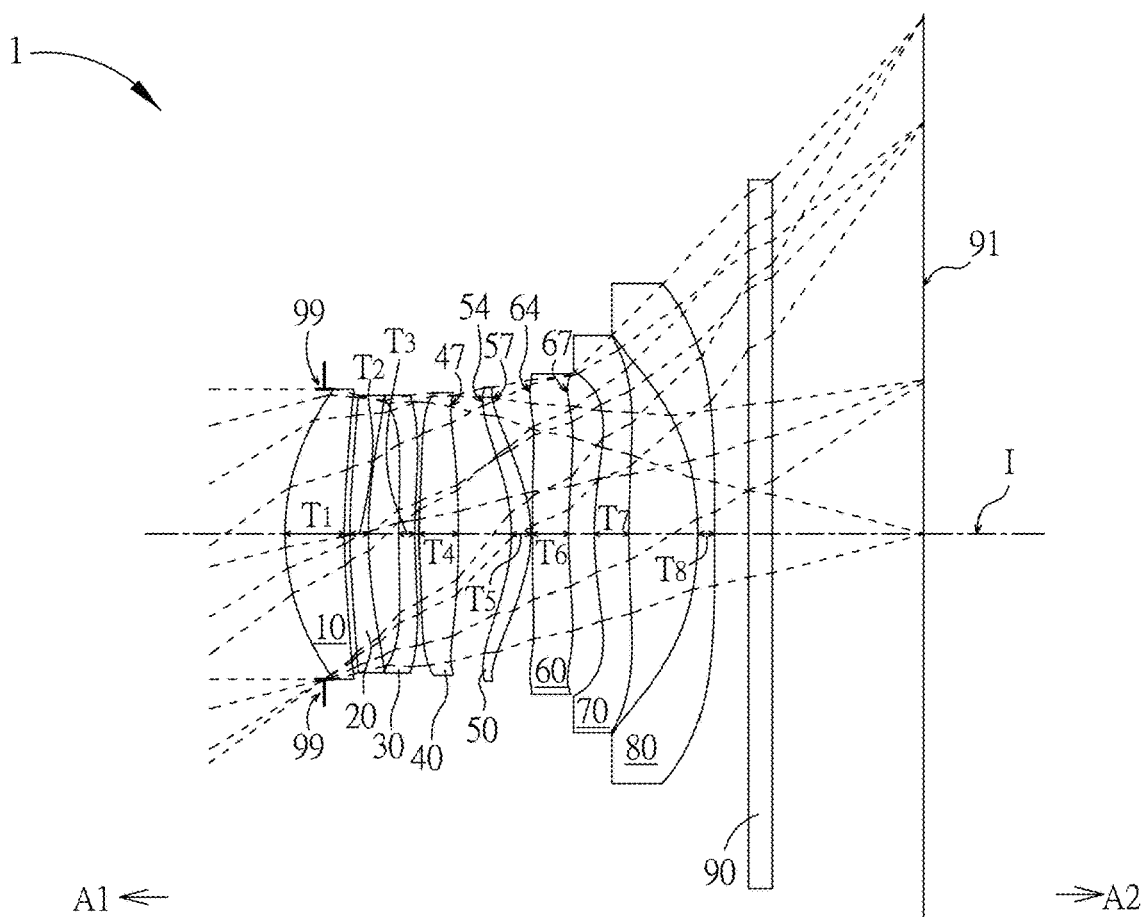
FIG. 10
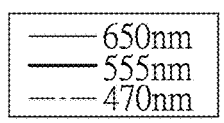
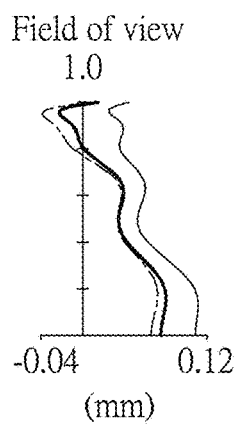
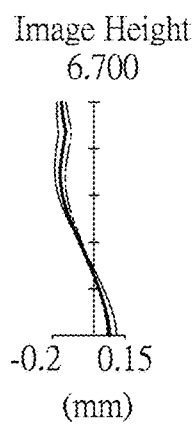
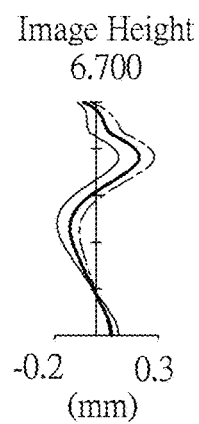
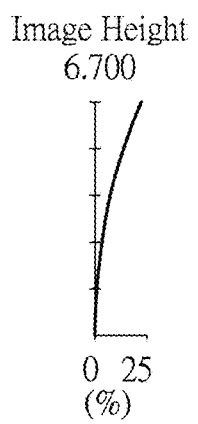
FIG. 11A  FIG. 11B  FIG. 11C  FIG. 11D Field of view
1.0

-0.25   0.05
(mm)
Longitudinal
spherical aberration

Image Height
6.700

-0.3   0.1
(mm)
Sagittal field
curvature

Image Height
6.700

-0.35   0.4
(mm)
Tangential
field curvature

Image Height
6.700

0   40
(%)
Distortion

Longitudinal spherical aberration

Sagittal field curvature

Tangential field curvature

Distortion

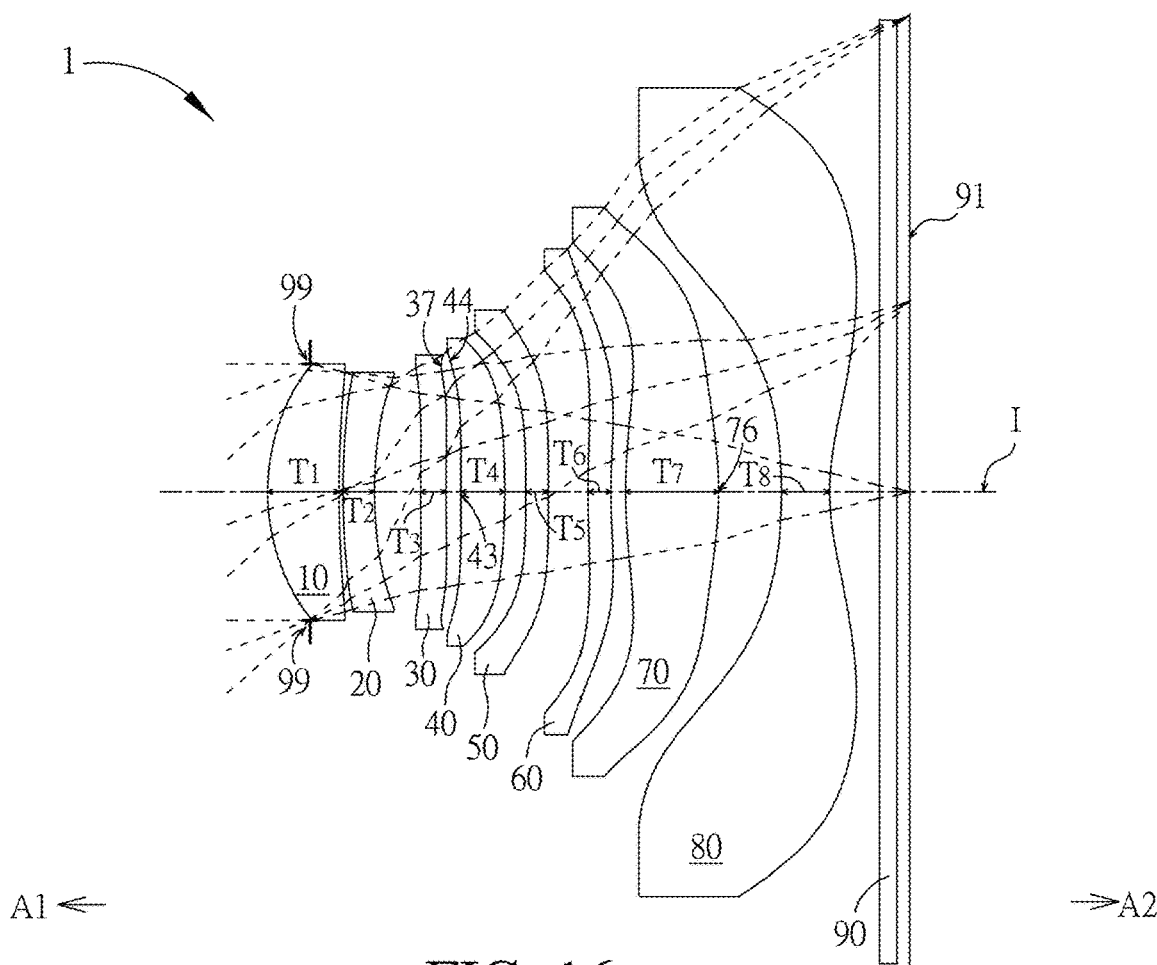
FIG. 16
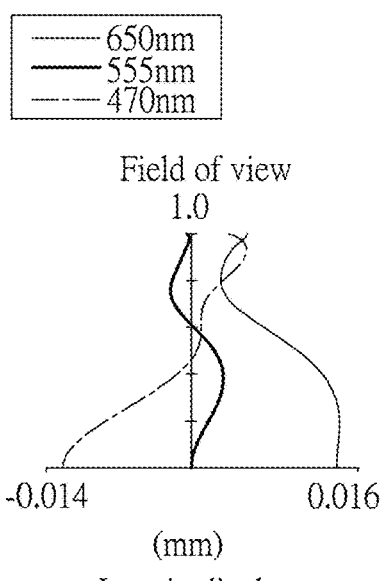
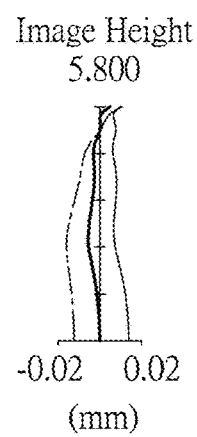
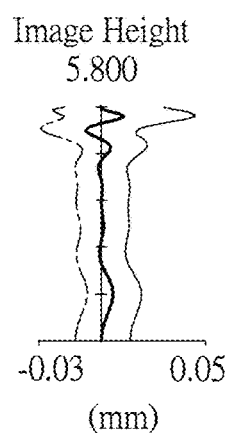
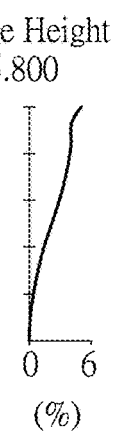
FIG. 17A   FIG. 17B   FIG. 17C   FIG. 17D

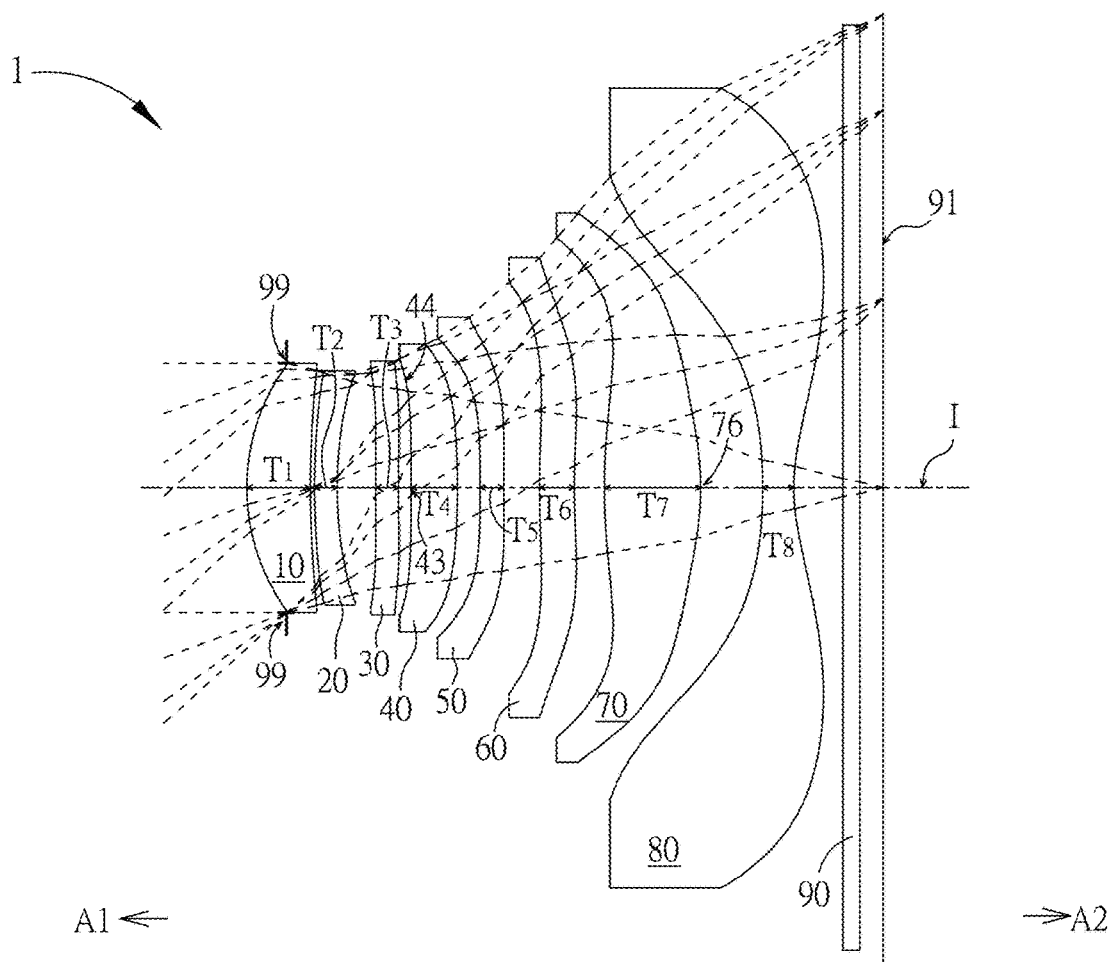
FIG. 18
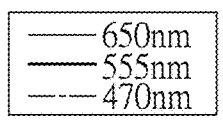
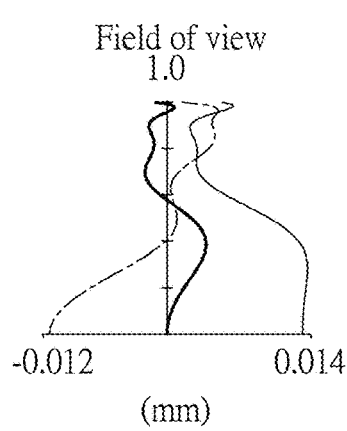
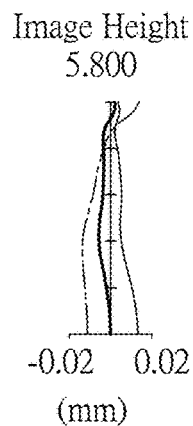
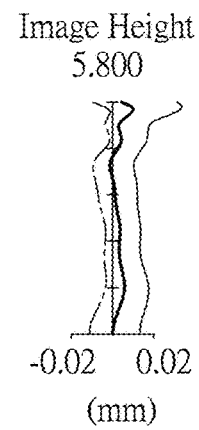
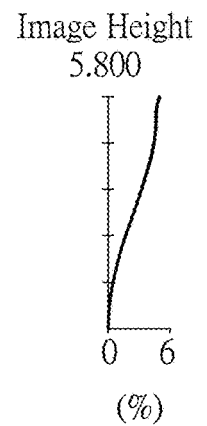
FIG. 19A  FIG. 19B  FIG. 19C  FIG. 9D Field of view
1.0

-0.012    0.014
(mm)
Longitudinal
spherical aberration

Image Height
5.800

-0.02   0.02
(mm)
Sagittal field
curvature

Image Height
5.800

-0.025  0.035
(mm)
Tangential
field curvature

Image Height
5.800

0      6
(%)
Distortion

OPTICAL IMAGING LENS INCLUDING EIGHT LENSES OF +--++-+-, ++-++-+- OR +--+--+- REFRACTIVE POWERS

BACKGROUND OF THE INVENTION

1. Field of the Invention

The present invention generally relates to an optical imaging lens. Specifically speaking, the present invention is directed to an optical imaging lens for use in a portable electronic device such as a mobile phone, a camera, a tablet personal computer, a personal digital assistant (PDA), or a head mounted display (AR, VR, MR) for taking pictures or for recording videos.

2. Description of the Prior Art

In recent years, the optical imaging lens has been evolving and applied in a wider range. In addition to requiring the lens to be thinner and shorter, a smaller f-number (Fno) is conducive to improving the luminous flux of the optical imaging lens, and it has gradually become a trend to design a larger field of view. In addition, in order to improve the pixel and resolution, it is necessary to increase the image height of the lens and adopt a larger image sensor to receive the imaging light to meet the high pixel demand.

Therefore, how to design an optical imaging lens which is light, thin, short, having small f-number, having large image height and good in imaging quality has become a problem to be challenged and solved.

SUMMARY OF THE INVENTION

In light of the above, the present invention proposes an optical imaging lens of eight lens elements which has smaller Fno, larger image height and good imaging quality. The optical imaging lens of eight lens elements of the present invention from an object side to an image side in order along an optical axis has a first lens element, a second lens element, a third lens element, a fourth lens element, a fifth lens element, a sixth lens element, a seventh lens element and an eight lens element. Each of the first lens element, second lens element, third lens element, fourth lens element, fifth lens element, sixth lens element, seventh lens element and eighth lens element respectively has an object-side surface which faces toward the object side to allow imaging rays to pass through as well as an image-side surface which faces toward the image side to allow the imaging rays to pass through.

In one embodiment of the present invention, an optical axis region of the image-side surface of the first lens element is concave, the third lens element has negative refracting power, a periphery region of the object-side surface of the third lens element is concave, the sixth lens element has negative refracting power, an optical axis region of the object-side surface of the sixth lens element is convex, the seventh lens element has positive refracting power, and a periphery region of the object-side surface of the seventh lens element is concave, wherein lens elements included by the optical imaging lens are only the eight lens elements described above, and wherein the optical imaging lens satisfies the relationship: $|V2-V3| \leq 5.000$, $D12/(G45+G67) \leq 4.100$.

In another embodiment of the present invention, the third lens element has negative refracting power, a periphery region of the object-side surface of the third lens element is concave, the sixth lens element has negative refracting power, an optical axis region on the object-side surface of the sixth lens element is convex, the seventh lens element has positive refracting power, wherein lens elements included by the optical imaging lens are only the eight lens elements described above, and wherein the optical imaging lens satisfies the relationships: $|V2-V3| \leq 5.000$, $D12/(G45+G67) \leq 3.000$.

In another embodiment of the present invention, the third lens element has negative refracting power, and a periphery region of the object-side surface of the third lens element is concave, a periphery region of the object-side surface of the fourth lens element is concave, the sixth lens element has negative refracting power, an optical axis region of the image-side surface of the seventh lens element is convex, wherein lens elements included by the optical imaging lens are only the eight lens elements described above, and wherein the optical imaging lens satisfies the relationship: $|V2-V3| \leq 5.000$.

In the optical imaging lens of the present invention, the embodiments may also selectively satisfy the following optical conditions:

$(G45+T7)/(G34+T8) \geq 1.800$;

$(G78+T8)/(G12+G67) \leq 6.000$;

$(TL+EFL)/Fno \geq 6.400$ mm;

$AAG/T8 \geq 4.200$;

$ALT/(G23+T3) \geq 5.000$;

$G\max/T\min \geq 2.700$;

$(T1+T4)/(T5+G56) \geq 1.850$;

$TL/(G12+T3+G34) \geq 12.600$;

$TTL/Fno \geq 3.900$ mm;

$AAG/T\min \geq 9.000$;

$ALT/(T\min+G\max) \leq 4.500$;

$(T1+G34+T8)BFL \leq 1.700$;

$G68/T2 \geq 5.400$;

$(EFL+BFL)/Fno \geq 3.600$ mm;

$ImgH/Fno \geq 2.900$ mm;

$AAG/(T5+G56+T6) \leq 3.300$;

$TTL/(T\min+G\max) \leq 7.500$;

$(T2+T4)/(T6+G67) \leq 2.000$;

$|V5-V6| \geq 20.000$;

$V3+V4+V8 \geq 120.000$;

$V1+V4+V7 \geq 130.000$;

$V4-V3 \geq 15.000$;

at least two lens elements have Abbe number greater than or equal to 50 from the sixth lens element to the eighth lens element, that is, two (or all three) Abbe number of V6, V7 and V8 are greater than or equal to 50; and there are no more than three lens element with Abbe number less than 50 from the first lens element to the fifth lens element, that is, only three (or less than three) of V1, V2, V3, V4, and V5 have Abbe number less than 50 at most.

In the present invention, T1 is a thickness of the first lens element along the optical axis, T2 is a thickness of the second lens element along the optical axis, T3 is a thickness of the third lens element along the optical axis, T4 is a thickness of the fourth lens element along the optical axis, T5 is a thickness of the fifth lens element along the optical axis, T6 is a thickness of the sixth lens element along the optical axis, T7 is a thickness of the seventh lens element along the optical axis, T8 is a thickness of the eighth lens element along the optical axis, G12 is an air gap between the first lens element and the second lens element along the optical axis, G23 is an air gap between the second lens element and the third lens element along the optical axis, G34 is an air gap between the third lens element and the fourth lens element along the optical axis, G45 is an air gap between the fourth lens element and the fifth lens element along the optical axis, G56 is an air gap between the fifth lens element and the sixth lens element along the optical axis, G67 is an air gap between the sixth lens element and the seventh lens element along the optical axis, G78 is an air gap between the seventh lens element and the eighth lens element along the optical axis, ALT is a sum of the thicknesses of eight lens elements from the first lens element to the eighth lens element along the optical axis, TL is a distance from the object-side surface of the first lens element to the image-side surface of the eighth lens element along the optical axis, TTL is the distance from the object-side surface of the first lens element to an image plane along the optical axis, BFL is a distance from the image-side surface of the eighth lens element to an image plane along the optical axis, AAG is a sum of seven air gaps from the first lens element to the eighth lens element along the optical axis, EFL is an effective focal length of the optical imaging lens, ImgH is an image height of the optical imaging lens, and Fno is a f-number of the optical imaging lens.

Besides, an Abbe number of the first lens element is V1; an Abbe number of the second lens element is V2; an Abbe number of the third lens element is V3; an Abbe number of the fourth lens element is V4; an Abbe number of the fifth lens element is V5; an Abbe number of the sixth lens element is V6; an Abbe number of the seventh lens element is V7, and an Abbe number of the eighth lens element is V8.

In the present invention, further defining: Gmax is a maximum air gaps from the first lens element to the eighth lens element along the optical axis, that is, the maximum value of G12, G23, G34, G45, G56, G67 and G78; Tmin is a minimum thickness from the first lens element to the eighth lens element along the optical axis, that is, the minimum value of T1, T2, T3, T4, T5, T6, T7 and T8; D12 is a distance from the object-side surface of the first lens element to the image-side surface of the second lens element along the optical axis, that is, the sum of T1, G12 and T2; G68 is a distance from the image-side surface of the sixth lens element to the object-side surface of the eighth lens element along the optical axis, that is, the sum of G67, T7 and G78.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 10 illustrates a third embodiment of the optical imaging lens of the present invention.

FIG. 11A illustrates the longitudinal spherical aberration on the image plane of the third embodiment.

FIG. 11B illustrates the field curvature aberration on the sagittal direction of the third embodiment.

FIG. 11C illustrates the field curvature aberration on the tangential direction of the third embodiment.

FIG. 11D illustrates the distortion of the third embodiment.

FIG. 16 illustrates a sixth embodiment of the optical imaging lens of the present invention.

FIG. 17A illustrates the longitudinal spherical aberration on the image plane of the sixth embodiment.

FIG. 17B illustrates the field curvature aberration on the sagittal direction of the sixth embodiment.

FIG. 17C illustrates the field curvature aberration on the tangential direction of the sixth embodiment.

FIG. 17D illustrates the distortion of the sixth embodiment.

FIG. 18 illustrates a seventh embodiment of the optical imaging lens of the present invention.

FIG. 19A illustrates the longitudinal spherical aberration on the image plane of the seventh embodiment.

FIG. 19B illustrates the field curvature aberration on the sagittal direction of the seventh embodiment.

FIG. 19C illustrates the field curvature aberration on the tangential direction of the seventh embodiment.

FIG. 19D illustrates the distortion of the seventh embodiment.

DETAILED DESCRIPTION

The terms "optical axis region", "periphery region", "concave", and "convex" used in this specification and claims should be interpreted based on the definition listed in the specification by the principle of lexicographer.

Figure 1:
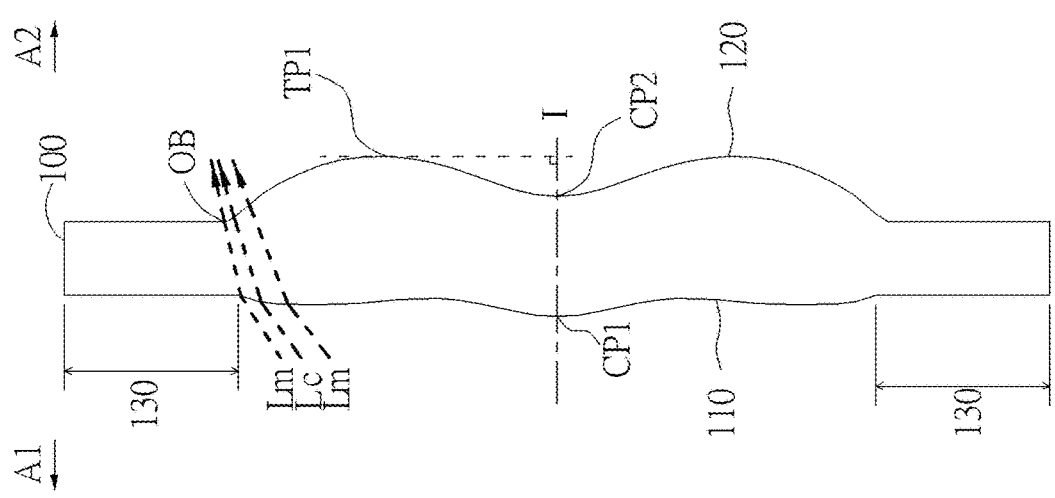

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
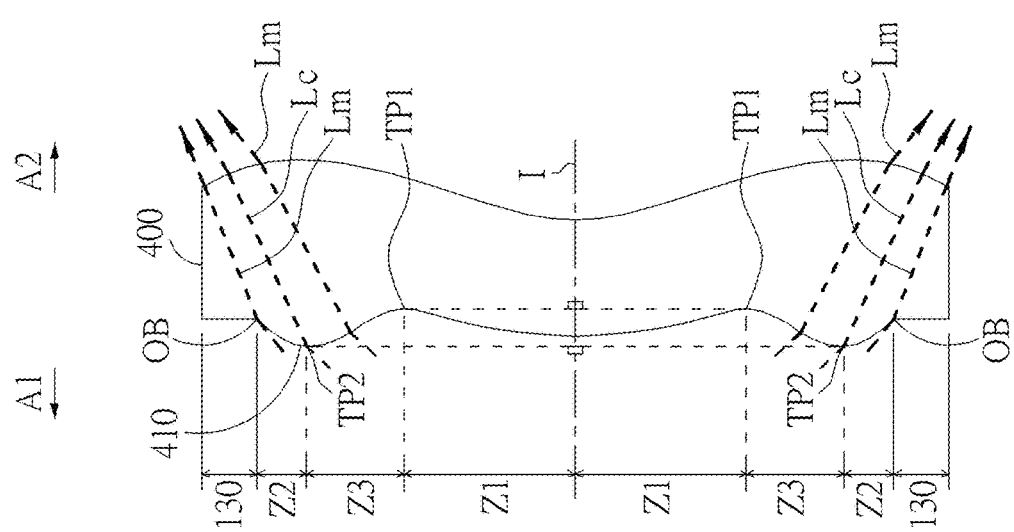

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
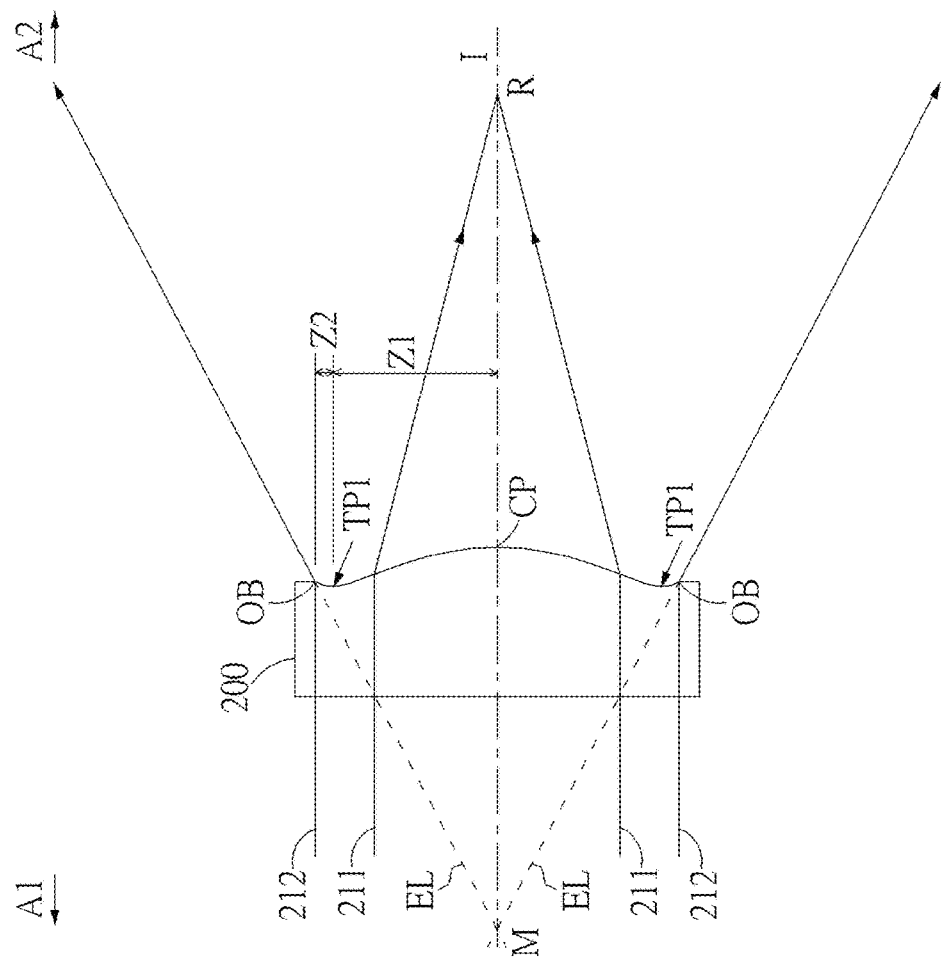
FIGS. 1-5 illustrate the methods for determining the surface shapes and for determining optical axis region or periphery region of one lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
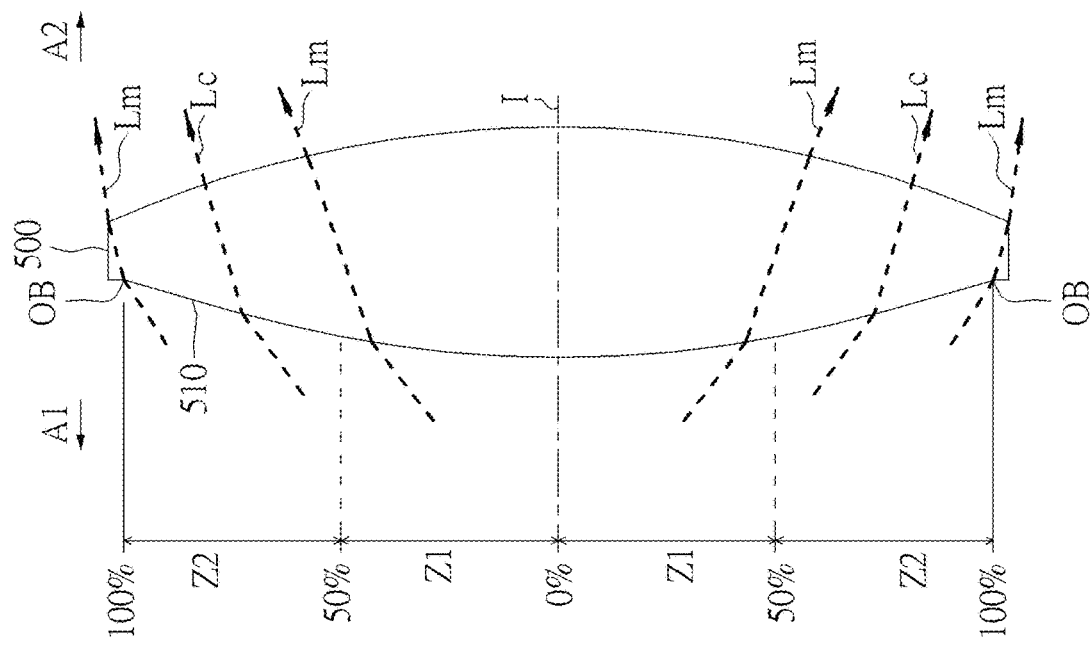
Figure 3:
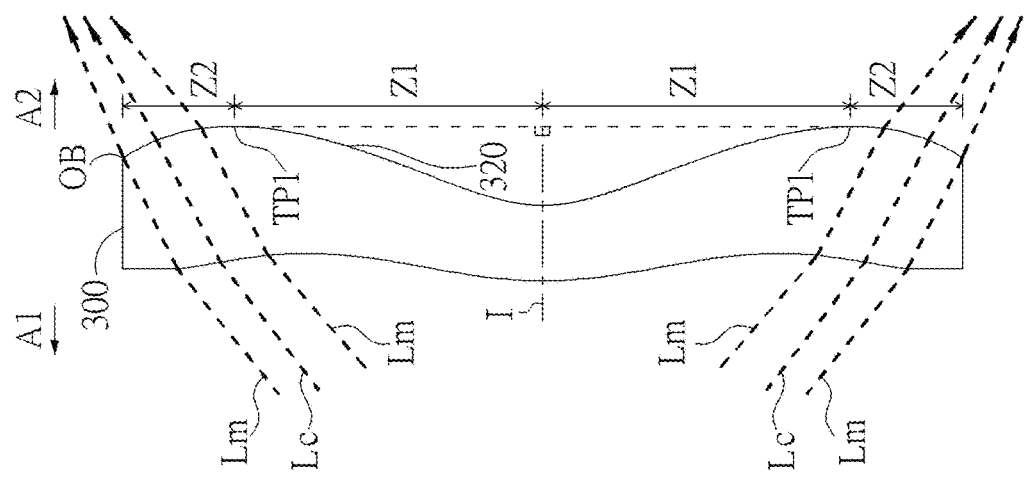

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
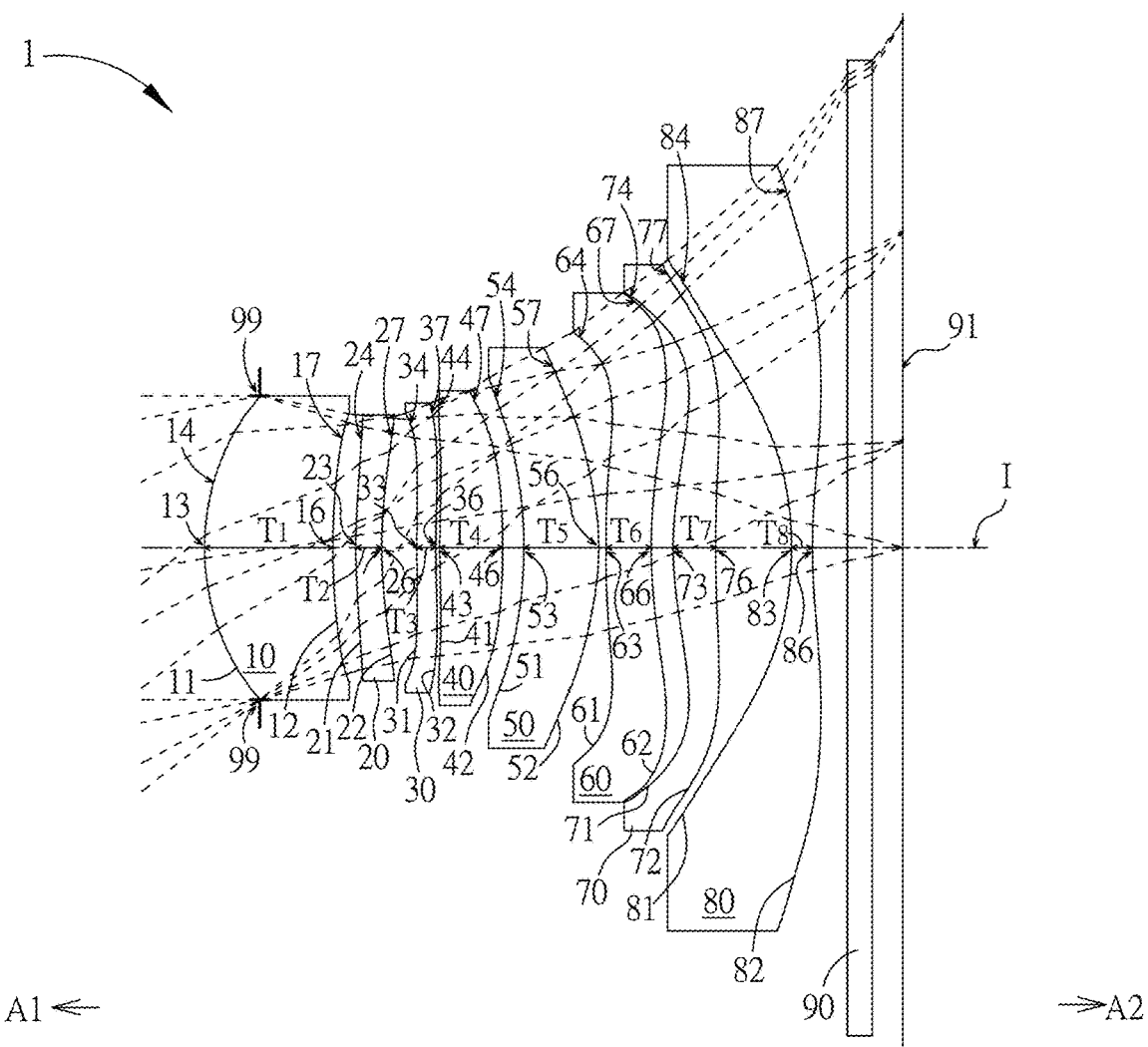
FIG. 6 illustrates a first embodiment of the optical imaging lens of the present invention.

As shown in FIG. 6, the optical imaging lens 1 of eight lens elements of the present invention, sequentially located from an object side A1 (where an object is located) to an image side A2 along an optical axis I, has an aperture stop (ape. stop) 99, a first lens element 10, a second lens element 20, a third lens element 30, a fourth lens element 40, a fifth lens element 50, a sixth lens element 60, a seventh lens element 70, an eighth lens element 80, a filter 90 and an image plane 91. Generally speaking, the first lens element 10, the second lens element 20, the third lens element 30, the fourth lens element 40, the fifth lens element 50, the sixth lens element 60, the seventh lens element 70 and the eighth lens element 80 may be made of a transparent plastic material but the present invention is not limited to this, and each has an appropriate refracting power. In the present invention, lens elements having refracting power included by the optical imaging lens 1 are only the eight lens elements described above. The optical axis I is the optical axis of the entire optical imaging lens 1, and the optical axis of each of the lens elements coincides with the optical axis of the optical imaging lens 1.

Furthermore, the optical imaging lens 1 includes an aperture stop (ape. stop) 99 disposed in an appropriate position. In FIG. 6, the aperture stop 99 is disposed between the first lens element 10 and object side A1. When light emitted or reflected by an object (not shown) which is located at the object side A1 enters the optical imaging lens 1 of the present invention, it forms a clear and sharp image on the image plane 91 at the image side A2 after passing through the aperture stop 99, the first lens element 10, the second lens element 20, the third lens element 30, the fourth lens element 40, the fifth lens element 50, the sixth lens element 60, the seventh lens element 70, the eighth lens element 80 and the filter 90. In one embodiment of the present invention, the optional filter 90 may be a filter of various suitable functions, for example, the filter 90 may be an infrared cut filter (IR cut filter), placed between the eighth lens element 80 and the image plane 91.

Each lens element in the optical imaging lens 1 of the present invention has an object-side surface facing toward the object side A1 as well as an image-side surface facing toward the image side A2. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52; the sixth lens element 60 has an object-side surface 61 and an image-side surface 62; the seventh lens element 70 has an object-side surface 71 and an image-side surface 72; and the eighth lens element 80 has an object-side surface 81 and an image-side surface 82. In addition, each object-side surface and image-side surface in the optical imaging lens 1 of the present invention has an optical axis region and a periphery region.

Each lens element in the optical imaging lens 1 of the present invention further has a thickness T along the optical axis I. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, the sixth lens element 60 has a sixth lens element thickness T6, the seventh lens element 70 has a seventh lens element thickness T7, the eighth lens element 80 has an eighth lens element thickness T8. Therefore, the sum of the thicknesses of eight lens elements from the first lens element 10 to the eighth lens element 80 in the optical imaging lens 1 along the optical axis I is ALT=T1+T2+T3+T4+T5+T6+T7+T8.

In addition, between two adjacent lens elements in the optical imaging lens 1 of the present invention there may be an air gap along the optical axis I. For example, there is an air gap G12 disposed between the first lens element 10 and the second lens element 20, an air gap G23 disposed between the second lens element 20 and the third lens element 30, an air gap G34 disposed between the third lens element 30 and the fourth lens element 40, an air gap G45 disposed between the fourth lens element 40 and the fifth lens element 50, an air gap G56 disposed between the fifth lens element 50 and the sixth lens element 60, an air gap G67 disposed between the sixth lens element 60 and the seventh lens element 70 as well as an air gap G78 disposed between the seventh lens element 70 and the eighth lens element 80. Therefore, the sum of seven air gaps from the first lens element 10 to the eighth lens element 80 along the optical axis I is AAG=G12+G23+G34+G45+G56+G67+G78.

In addition, a distance from the object-side surface 11 of the first lens element 10 to the image plane 91 along the optical axis I is TTL, namely a system length of the optical imaging lens 1; an effective focal length of the optical imaging lens element is EFL; a distance from the object-side surface 11 of the first lens element 10 to the image-side surface 82 of the eighth lens element 80 along the optical axis I is TL; HFOV stands for the half field of view which is half of the field of view of the entire optical imaging lens element system; ImgH is an image height of the optical imaging lens 1, and Fno is a f-number of the optical imaging lens 1.

When the filter 90 is placed between the eighth lens element 80 and the image plane 91, an air gap between the eighth lens element 80 and the filter 90 along the optical axis I is G8F; a thickness of the filter 90 along the optical axis I is TF; an air gap between the filter 90 and the image plane 91 along the optical axis I is GFP; and a distance from the image-side surface 82 of the eighth lens element 80 to the image plane 91 along the optical axis I is BFL. Therefore, BFL=G8F+TF+GFP.

Furthermore, a focal length of the first lens element 10 is f1; a focal length of the second lens element 20 is f2; a focal length of the third lens element 30 is f3; a focal length of the fourth lens element 40 is f4; a focal length of the fifth lens element 50 is f5; a focal length of the sixth lens element 60 is f6; a focal length of the seventh lens element 70 is f7; a focal length of the eighth lens element 80 is f8; a refractive index of the first lens element 10 is n1; a refractive index of the second lens element 20 is n2; a refractive index of the third lens element 30 is n3; a refractive index of the fourth lens element 40 is n4; a refractive index of the fifth lens element 50 is n5; a refractive index of the sixth lens element 60 is n6; a refractive index of the seventh lens element 70 is n7; a refractive index of the eighth lens element 80 is n8; an Abbe number of the first lens element 10 is V1; an Abbe number of the second lens element 20 is V2; an Abbe number of the third lens element 30 is V3; and an Abbe number of the fourth lens element 40 is V4; an Abbe number of the fifth lens element 50 is V5; an Abbe number of the sixth lens element 60 is V6; an Abbe number of the seventh lens element 70 is V7; and an Abbe number of the eighth lens element 80 is V8.

In the present invention, further defining: Gmax is a maximum air gaps from the first lens element 10 to the eighth lens element 80 along the optical axis I, that is, a maximum value of G12, G23, G34, G45, G56, G67 and G78; Tmax is a maximum thickness from the first lens element 10 to the eighth lens element 80 along the optical axis I, that is, the maximum value of T1, T2, T3, T4, T5, T6, T7 and T8; Tmin is a minimum thickness from the first lens element 10 to the eighth lens element 80 along the optical axis I, that is, a minimum value of T1, T2, T3, T4, T5, T6, T7 and T8; D12 is a distance from the object-side surface 11 of the first lens element 10 to the image-side surface 22 of the second lens element 20 along the optical axis I, that is, the sum of T1, G12 and T2; G68 is a distance from the image-side surface 62 of the sixth lens element 60 to the object-side surface 81 of the eighth lens element 80 along the optical axis I, that is, the sum of G67, T7 and G78.

First Embodiment

Please refer to FIG. 6 which illustrates the first embodiment of the optical imaging lens 1 of the present invention.

Figure 7A:
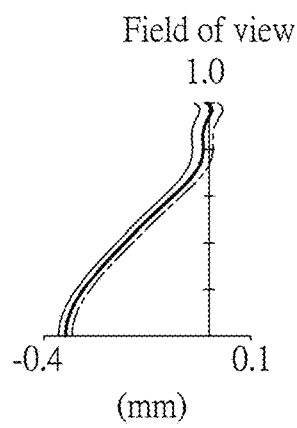
FIG. 7A illustrates the longitudinal spherical aberration on the image plane of the first embodiment.
Figure 7B:
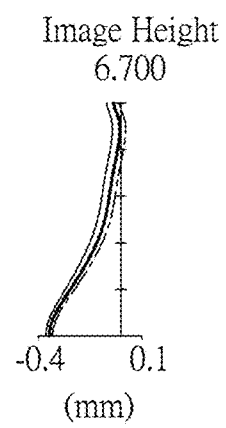
FIG. 7B illustrates the field curvature aberration on the sagittal direction of the first embodiment.
Figure 7C:
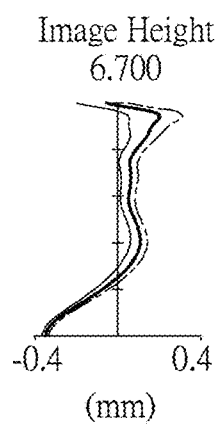
FIG. 7C illustrates the field curvature aberration on the tangential direction of the first embodiment.
Figure 7D:
FIG. 7D illustrates the distortion of the first embodiment.

Please refer to FIG. 7A for the longitudinal spherical aberration on the image plane 91 of the first embodiment; please refer to FIG. 7B for the field curvature aberration on the sagittal direction; please refer to FIG. 7C for the field curvature aberration on the tangential direction; and please refer to FIG. 7D for the distortion aberration. The Y axis of the spherical aberration in each embodiment is "field of view" for 1.0. The Y axis of the astigmatic field and the distortion in each embodiment stands for "image height" (ImgH), which is 6.700 mm.

The optical imaging lens 1 of the first embodiment exclusively has eight lens elements 10, 20, 30, 40, 50, 60, 70 and 80 with refracting power. The optical imaging lens 1 also has an aperture stop 99. The aperture stop 99 is provided between the first lens element 10 and the object side A1.

The first lens element 10 has positive refracting power. An optical axis region 13 of the object-side surface 11 of the first lens element 10 is convex, and a periphery region 14 of the object-side surface 11 of the first lens element 10 is convex. An optical axis region 16 of the image-side surface 12 of the first lens element 10 is concave, and a periphery region 17 of the image-side surface 12 of the first lens element 10 is concave. Besides, both the object-side surface 11 and the image-side surface 12 of the first lens element 10 are aspheric surfaces, but it is not limited thereto.

The second lens element 20 has negative refracting power. An optical axis region 23 of the object-side surface 21 of the second lens element 20 is convex, and a periphery region 24 of the object-side surface 21 of the second lens element 20 is convex. An optical axis region 26 of the image-side surface 22 of the second lens element 20 is concave, and a periphery region 27 of the image-side surface 22 of the second lens element 20 is concave. Besides, both the object-side surface 21 and the image-side surface 22 of the second lens element 20 are aspheric surfaces, but it is not limited thereto.

The third lens element 30 has negative refracting power. An optical axis region 33 of the object-side surface 31 of the third lens element 30 is convex, and a periphery region 34 of the object-side surface 31 of the third lens element 30 is concave. An optical axis region 36 of the image-side surface 32 of the third lens element 30 is concave, and a periphery region 37 of the image-side surface 32 of the third lens element 30 is convex. Besides, both the object-side surface 31 and the image-side surface 32 of the third lens element 30 are aspheric surfaces, but it is not limited thereto.

The fourth lens element 40 has positive refracting power. An optical axis region 43 of the object-side surface 41 of the fourth lens element 40 is convex, and a periphery region 44 of the object-side surface 41 of the fourth lens element 40 is convex. An optical axis region 46 of the image-side surface 42 of the fourth lens element 40 is convex, and a periphery region 47 of the image-side surface 42 of the fourth lens element 40 is convex. Besides, both the object-side surface 41 and the image-side surface 42 of the fourth lens element 40 are aspheric surfaces, but it is not limited thereto.

The fifth lens element 50 has positive refracting power. An optical axis region 53 of the object-side surface 51 of the fifth lens element 50 is concave, and a periphery region 54 of the object-side surface 51 of the fifth lens element 50 is concave. An optical axis region 56 of the image-side surface 52 of the fifth lens element 50 is convex, and a periphery region 57 of the image-side surface 52 of the fifth lens element 50 is convex. Besides, both the object-side surface 51 and the image-side surface 52 of the fifth lens element 50 are aspheric surfaces, but it is not limited thereto.

The sixth lens element 60 has negative refracting power. An optical axis region 63 of the object-side surface 61 of the sixth lens element 60 is convex, and a periphery region 64 of the object-side surface 61 of the sixth lens element 60 is concave. An optical axis region 66 of the image-side surface 62 of the sixth lens element 60 is concave, and a periphery region 67 of the image-side surface 62 of the sixth lens element 60 is convex. Besides, both the object-side surface 61 and the image-side surface 62 of the sixth lens element 60 are aspheric surfaces, but it is not limited thereto.

The seventh lens element 70 has positive refracting power. An optical axis region 73 of the object-side surface 71 of the seventh lens element 70 is convex, and a periphery region 74 of the object-side surface 71 of the seventh lens element 70 is concave. An optical axis region 76 of the image-side surface 72 of the seventh lens element 70 is concave, and a periphery region 77 of the image-side surface 72 of the seventh lens element 70 is convex. Besides, both the object-side surface 71 and the image-side surface 72 of the seventh lens element 70 are aspheric surfaces, but it is not limited thereto.

The eighth lens element 80 has negative refracting power. An optical axis region 83 of the object-side surface 81 of the eighth lens element 80 is concave, and a periphery region 84 of the object-side surface 81 of the eighth lens element 80 is concave. An optical axis region 86 of the image-side surface 82 of the eighth lens element 80 is concave, and a periphery region 87 of the image-side surface 82 of the eighth lens element 80 is convex. Besides, both the object-side surface 81 and the image-side surface 82 of the eighth lens element 80 are aspheric surfaces, but it is not limited thereto.

In the first lens element 10, the second lens element 20, the third lens element 30, the fourth lens element 40, the fifth lens element 50, the sixth lens element 60, the seventh lens element 70 and the eighth lens element 80 of the optical imaging lens element 1 of the present invention, there are 16 surfaces, such as the object-side surfaces 11/21/31/41/51/61/71/81 and the image-side surfaces 12/22/32/42/52/62/72/82. If a surface is aspheric, these aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

In which:
Y represents a vertical distance from a point on the aspheric surface to the optical axis;
Z represents the depth of an aspheric surface (the perpendicular distance between the point of the aspheric surface at a distance Y from the optical axis and the tangent plane of the vertex on the optical axis of the aspheric surface);
R represents the curvature radius of the lens element surface;
K is a conic constant; and
$a_{2i}$ is the aspheric coefficient of the $2i^{th}$ order.

The optical data of the first embodiment of the optical imaging lens 1 are shown in TABLE 1 while the aspheric surface data are shown in TABLE 2. In the present embodiments of the optical imaging lens, the f-number of the entire optical imaging lens element system is Fno, EFL is the effective focal length, HFOV stands for the half field of view which is half of the field of view of the entire optical imaging lens element system, and the unit for the curvature radius, the thickness and the focal length is in millimeters (mm). In this embodiment, EFL=6.171 mm; HFOV=37.773 degrees; TTL=8.848 mm; Fno=1.600; ImgH=6.700 mm.

TABLE 1

First Embodiment
EFL = 6.171 mm; HFOV = 37.773 degrees; TTL = 8.848 mm; Fno = 1.600; ImgH = 6.700 mm

| No. | | Radius of Curvature (mm) | Ape. Stop Distance Lens Thickness Air Gap (mm) | | Material | Refractive Index | Abbe No. | Focal Length (mm) |
|---|---|---|---|---|---|---|---|---|
| | Object | Infinity | Infinity | | | | | |
| 99 | Ape. Stop | Infinity | −0.703 | | | | | |
| 11 | First Lens | 3.065 | 1.622 | T1 | Plastic | 1.545 | 55.987 | 8.123 |
| 12 | | 8.059 | 0.292 | G12 | | | | |
| 21 | Second Lens | 7.382 | 0.330 | T2 | Plastic | 1.671 | 19.480 | −43.036 |
| 22 | | 5.784 | 0.447 | G23 | | | | |
| 31 | Third Lens | 27.335 | 0.239 | T3 | Plastic | 1.671 | 19.480 | −29.262 |
| 32 | | 11.451 | 0.052 | G34 | | | | |
| 41 | Fourth Lens | 12.879 | 0.798 | T4 | Plastic | 1.545 | 55.987 | 10.234 |
| 42 | | −9.663 | 0.269 | G45 | | | | |
| 51 | Fifth Lens | −6.028 | 0.945 | T5 | Plastic | 1.545 | 55.987 | 11.817 |
| 52 | | −3.290 | 0.093 | G56 | | | | |
| 61 | Sixth Lens | 49.817 | 0.574 | T6 | Plastic | 1.661 | 20.373 | −11.933 |
| 62 | | 6.832 | 0.278 | G67 | | | | |
| 71 | Seventh Lens | 4.157 | 0.540 | T7 | Plastic | 1.545 | 55.987 | 9.721 |
| 72 | | 18.254 | 0.963 | G78 | | | | |
| 81 | Eighth Lens | −4.490 | 0.265 | T8 | Plastic | 1.545 | 55.987 | −5.012 |
| 82 | | 7.164 | 0.445 | G8F | | | | |
| 90 | Filter | Infinity | 0.308 | TF | | 1.560 | 51.300 | |
| | | Infinity | 0.387 | GFP | | | | |
| 91 | Image Plane | Infinity | | | | | | |

TABLE 2

| No. | K | $a_2$ | $a_4$ | $a_6$ | $a_8$ | $a_{10}$ |
|---|---|---|---|---|---|---|
| 11 | 1.467957E−01 | 0.000000E+00 | 2.503242E−05 | −1.003648E−03 | 1.286441E−03 | −8.171974E−04 |
| 12 | 1.021611E+01 | 0.000000E+00 | −1.187642E−02 | 4.991412E−03 | 6.569917E−04 | −1.559842E−03 |
| 21 | 1.157546E+01 | 0.000000E+00 | −3.296667E−02 | 8.671539E−03 | 5.905556E−04 | −2.306268E−03 |
| 22 | −1.047092E+01 | 0.000000E+00 | −1.327221E−02 | 3.547716E−03 | 4.490176E−03 | −5.186039E−03 |
| 31 | 1.307824E+02 | 0.000000E+00 | −2.506017E−02 | 1.913458E−02 | −2.164431E−02 | 1.410780E−02 |
| 32 | −1.800478E+01 | 0.000000E+00 | −4.149316E−02 | 3.486218E−02 | −2.987746E−02 | 1.564249E−02 |
| 41 | 9.143533E+00 | 0.000000E+00 | −4.278225E−02 | 3.194643E−02 | −2.557056E−02 | 1.320497E−02 |
| 42 | −5.720379E+01 | 0.000000E+00 | −1.880811E−02 | −9.822089E−04 | 1.731902E−03 | −1.734642E−03 |
| 51 | −1.207410E−01 | 0.000000E+00 | −2.429206E−02 | 3.515930E−02 | −3.025685E−02 | 1.605963E−02 |
| 52 | −9.123139E−01 | 0.000000E+00 | 3.973422E−02 | −1.292407E−02 | −2.284469E−03 | 3.432662E−03 |
| 61 | 1.362612E+02 | 0.000000E+00 | 4.692368E−02 | −3.323952E−02 | 1.266098E−02 | −3.369156E−03 |
| 62 | 4.438810E−01 | 0.000000E+00 | −3.687174E−03 | −1.427047E−03 | 4.719207E−04 | −2.264379E−04 |
| 71 | −3.609899E+01 | 0.000000E+00 | 1.573559E−02 | −1.258853E−02 | 4.463379E−03 | −1.049214E−03 |
| 72 | −5.150334E+00 | 0.000000E+00 | 1.261608E−03 | −3.489641E−03 | 8.134752E−04 | −1.170107E−04 |
| 81 | −5.082861E−01 | 0.000000E+00 | −1.168139E−02 | 2.434583E−03 | −2.734723E−04 | 2.896311E−05 |
| 82 | 1.093360E−01 | 0.000000E+00 | −1.682242E−02 | 1.721848E−03 | −6.039342E−05 | −6.599958E−06 |

| No. | $a_{12}$ | $a_{14}$ | $a_{16}$ | $a_{18}$ | $a_{20}$ |
|---|---|---|---|---|---|
| 11 | 3.082958E−04 | −5.908215E−05 | 4.572981E−06 | | |
| 12 | 7.482195E−04 | −1.593604E−04 | 1.546025E−05 | | |
| 21 | 1.041447E−03 | −2.203433E−04 | 2.011464E−05 | | |
| 22 | 2.338162E−03 | −5.373603E−04 | 5.039620E−05 | | |
| 31 | −5.748042E−03 | 1.254362E−03 | −1.132996E−04 | | |
| 32 | −4.857218E−03 | 8.319475E−04 | −6.059806E−05 | | |
| 41 | −3.824433E−03 | 5.794476E−04 | −3.534852E−05 | | |
| 42 | 8.179721E−04 | −1.835389E−04 | 1.647829E−05 | | |
| 51 | −5.552813E−03 | 1.250364E−03 | −1.753961E−04 | 1.387087E−05 | −4.706553E−07 |
| 52 | −1.301835E−03 | 2.612563E−04 | −2.967975E−05 | 1.794761E−06 | −4.502190E−08 |
| 61 | 5.867517E−04 | −5.930588E−05 | 2.343406E−06 | 8.286232E−08 | −7.404580E−09 |
| 62 | 6.416970E−05 | −1.001421E−05 | 8.687493E−07 | −3.959838E−08 | 7.354960E−10 |
| 71 | 1.545188E−04 | −1.435457E−05 | 8.256817E−07 | −2.692891E−08 | 3.761620E−10 |
| 72 | 9.236681E−06 | −3.188590E−07 | −6.504530E−10 | 3.207440E−10 | −5.850000E−12 |
| 81 | −2.512838E−06 | 1.447661E−07 | −5.074913E−09 | 9.823300E−11 | −9.370000E−13 |
| 82 | 7.505479E−07 | −2.622159E−08 | 1.565930E−10 | 9.641000E−12 | −1.550000E−13 |

Second Embodiment

Figure 8:
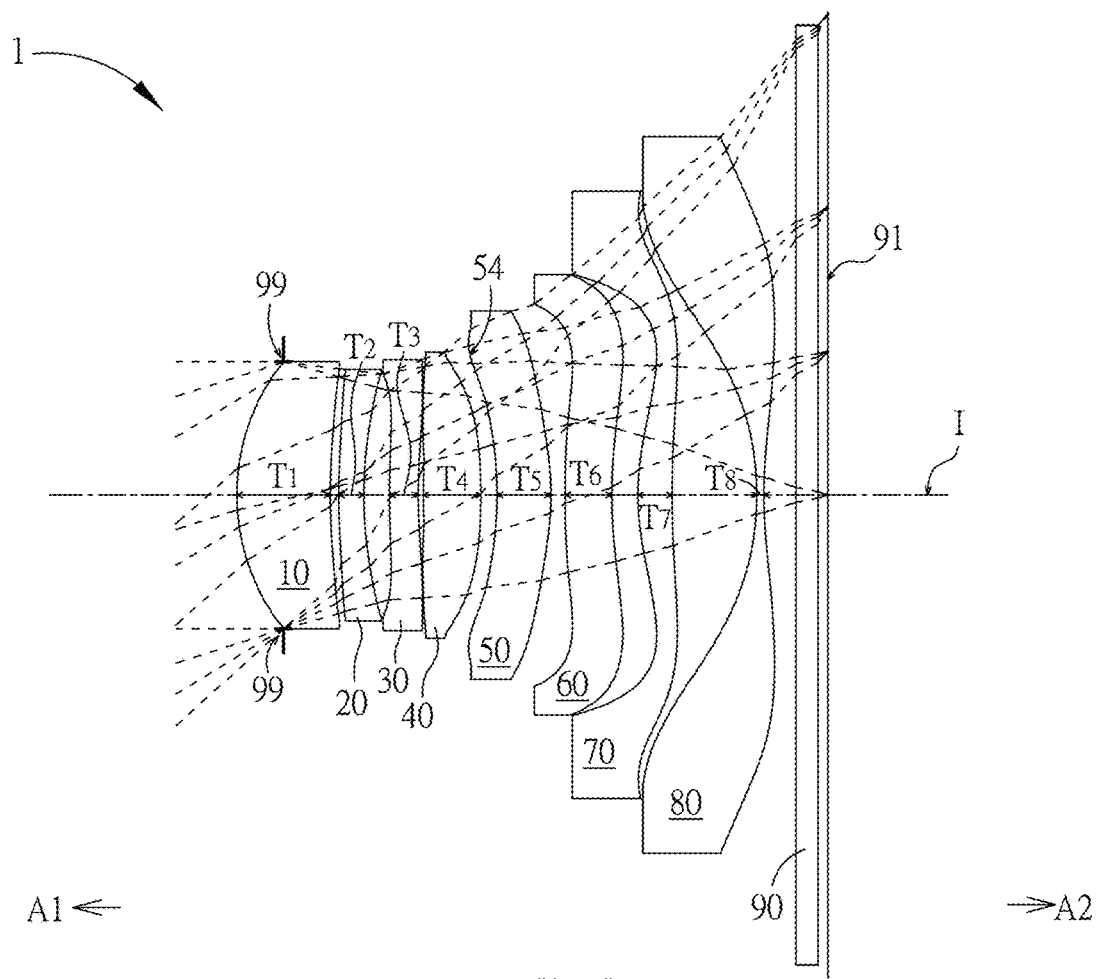
FIG. 8 illustrates a second embodiment of the optical imaging lens of the present invention.
Figure 9A:
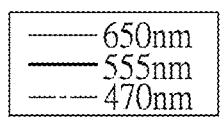
FIG. 9A illustrates the longitudinal spherical aberration on the image plane of the second embodiment.
Figure 9A:
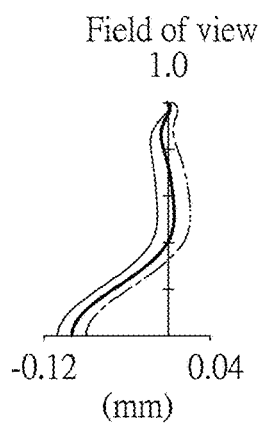
Figure 9B:
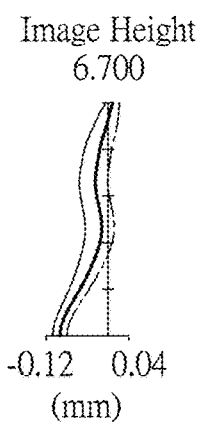
FIG. 9B illustrates the field curvature aberration on the sagittal direction of the second embodiment.
Figure 9C:
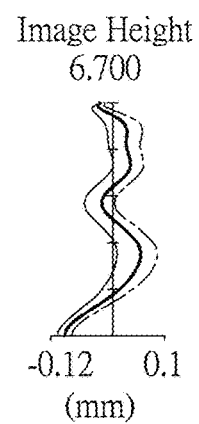
FIG. 9C illustrates the field curvature aberration on the tangential direction of the second embodiment.
Figure 9D:
FIG. 9D illustrates the distortion of the second embodiment.

Please refer to FIG. 8 which illustrates the second embodiment of the optical imaging lens 1 of the present invention. It is noted that from the second embodiment to the following embodiments, in order to simplify the figures, only the components different from what the first embodiment has, and the basic lens elements will be labeled in figures. Other components that are the same as what the first embodiment has, such as the object-side surface, the image-side surface, the portion in a vicinity of the optical axis and the portion in a vicinity of its periphery will be omitted in the following embodiments. Please refer to FIG. 9A for the longitudinal spherical aberration on the image plane 91 of the second embodiment, please refer to FIG. 9B for the field curvature aberration on the sagittal direction, please refer to FIG. 9C for the field curvature aberration on the tangential direction, and please refer to FIG. 9D for the distortion aberration. The components in this embodiment are similar to those in the first embodiment, but the optical data such as the curvature radius, the lens thickness, the aspheric surface or the back focal length in this embodiment are different from the optical data in the first embodiment. Besides, in this embodiment, the periphery region 54 of the object-side surface 51 of the fifth lens element 50 is convex.

The optical data of the second embodiment of the optical imaging lens are shown in TABLE 3 while the aspheric surface data are shown in TABLE 4. In this embodiment, EFL=5.962 mm; HFOV=41.952 degrees; TTL=8.233 mm; Fno=1.600; ImgH=6.700 mm. In particular: 1. The system length of the optical imaging lens TTL in this embodiment is shorter than the system length of the optical imaging lens TTL in the first embodiment; 2. The HFOV in this embodiment is larger than the HFOV in the first embodiment; 3. The longitudinal spherical aberration in this embodiment is smaller than the longitudinal spherical aberration in the first embodiment; 4. The field curvature aberration on the sagittal direction in this embodiment is smaller than the field curvature aberration on the sagittal direction in the first embodiment; 5. The field curvature aberration on the tangential direction in this embodiment is smaller than the field curvature aberration on the tangential direction in the first embodiment; 6. The distortion aberration in this embodiment is smaller than the distortion aberration in the first embodiment.

TABLE 3

Second Embodiment
EFL = 5.962 mm; HFOV = 41.952 degrees; TTL = 8.233 mm; Fno = 1.600; ImgH = 6.700 mm

| No. | | Radius of Curvature (mm) | Ape. Stop Distance Lens Thickness Air Gap (mm) | | Material | Refractive Index | Abbe No. | Focal Length (mm) |
|---|---|---|---|---|---|---|---|---|
| | Object | Infinity | Infinity | | | | | |
| 99 | Ape. Stop | Infinity | −0.652 | | | | | |
| 11 | First Lens | 3.032 | 1.303 | T1 | Plastic | 1.545 | 55.987 | 7.923 |
| 12 | | 8.592 | 0.117 | G12 | | | | |
| 21 | Second Lens | 8.526 | 0.351 | T2 | Plastic | 1.615 | 25.920 | −25.439 |
| 22 | | 5.445 | 0.358 | G23 | | | | |
| 31 | Third Lens | 10.682 | 0.393 | T3 | Plastic | 1.651 | 21.514 | −32.138 |
| 32 | | 6.988 | 0.072 | G34 | | | | |
| 41 | Fourth Lens | 10.357 | 0.802 | T4 | Plastic | 1.545 | 55.987 | 8.676 |
| 42 | | −8.498 | 0.225 | G45 | | | | |
| 51 | Fifth Lens | −5.840 | 0.755 | T5 | Plastic | 1.545 | 55.987 | 15.843 |
| 52 | | −3.646 | 0.201 | G56 | | | | |
| 61 | Sixth Lens | 164.836 | 0.648 | T6 | Plastic | 1.661 | 20.373 | −11.120 |
| 62 | | 7.088 | 0.366 | G67 | | | | |
| 71 | Seventh Lens | 3.558 | 0.476 | T7 | Plastic | 1.545 | 55.987 | 8.316 |
| 72 | | 15.641 | 1.172 | G78 | | | | |
| 81 | Eighth Lens | −4.393 | 0.100 | T8 | Plastic | 1.545 | 55.987 | −4.772 |
| 82 | | 6.463 | 0.445 | G8F | | | | |
| 90 | Filter | Infinity | 0.308 | TF | | 1.560 | 51.300 | |
| | | Infinity | 0.141 | GFP | | | | |
| 91 | Image Plane | Infinity | | | | | | |

TABLE 4

| No | K | $a_2$ | $a_4$ | $a_6$ | $a_8$ | $a_{10}$ |
|---|---|---|---|---|---|---|
| 11 | 1.583164E−01 | 0.000000E+00 | −1.804979E−05 | −7.859340E−04 | 1.220424E−03 | −8.331254E−04 |
| 12 | 8.604485E−02 | 0.000000E+00 | −1.650462E−02 | 5.031599E−03 | 8.038560E−04 | −1.581816E−03 |
| 21 | 1.297710E+01 | 0.000000E+00 | −3.150556E−02 | 9.693809E−03 | 6.206346E−04 | −2.300593E−03 |
| 22 | −2.560850E+00 | 0.000000E+00 | −1.170495E−02 | 3.484552E−03 | 4.713687E−03 | −5.163682E−03 |
| 31 | −1.560299E+01 | 0.000000E+00 | −2.632109E−02 | 1.853101E−02 | −2.182428E−02 | 1.409059E−02 |
| 32 | −9.674951E+00 | 0.000000E+00 | −3.965250E−02 | 3.532684E−02 | −2.972370E−02 | 1.565752E−02 |
| 41 | 1.292894E+01 | 0.000000E+00 | −4.176679E−02 | 3.197586E−02 | −2.561800E−02 | 1.319595E−02 |
| 42 | 5.173534E+00 | 0.000000E+00 | −2.100111E−02 | −4.429002E−04 | 1.746092E−03 | −1.732729E−03 |
| 51 | −1.525270E+00 | 0.000000E+00 | −2.319991E−02 | 3.543962E−02 | −3.019360E−02 | 1.606530E−02 |
| 52 | −3.106786E+00 | 0.000000E+00 | 4.230023E−02 | −1.304785E−02 | −2.369057E−03 | 3.425053E−03 |
| 61 | −6.765611E+03 | 0.000000E+00 | 5.438498E−02 | −3.402705E−02 | 1.261129E−02 | −3.363615E−03 |
| 62 | −4.467301E−01 | 0.000000E+00 | −4.031786E−03 | −1.586134E−03 | 4.603570E−04 | −2.263218E−04 |

TABLE 4-continued

| | | | | | |
|---|---|---|---|---|---|
| 71 | −1.757334E+01 | 0.000000E+00 | 1.554327E−02 | −1.281811E−02 | 4.455233E−03 | −1.049707E−03 |
| 72 | 9.737359E+00 | 0.000000E+00 | 2.469401E−03 | −3.478804E−03 | 8.121433E−04 | −1.171253E−04 |
| 81 | −3.779622E−01 | 0.000000E+00 | −1.243430E−02 | 2.472050E−03 | −2.686581E−04 | 2.914824E−05 |
| 82 | −1.966992E−01 | 0.000000E+00 | −1.630402E−02 | 1.656946E−03 | −6.086245E−05 | −6.579336E−06 |

| No. | $a_{12}$ | $a_{14}$ | $a_{16}$ | $a_{18}$ | $a_{20}$ |
|---|---|---|---|---|---|
| 11 | 3.095246E−04 | −5.805880E−05 | 4.370211E−06 | | |
| 12 | 7.324882E−04 | −1.629348E−04 | 1.541110E−05 | | |
| 21 | 1.048485E−03 | −2.195667E−04 | 1.966574E−05 | | |
| 22 | 2.328360E−03 | −5.376143E−04 | 5.355174E−05 | | |
| 31 | −5.743883E−03 | 1.258782E−03 | −1.102041E−04 | | |
| 32 | −4.861013E−03 | 8.300745E−04 | −6.060686E−05 | | |
| 41 | −3.824928E−03 | 5.791865E−04 | −3.584283E−05 | | |
| 42 | 8.174464E−04 | −1.834030E−04 | 1.671405E−05 | | |
| 51 | −5.552707E−03 | 1.250285E−03 | −1.754177E−04 | 1.386676E−05 | −4.713011E−07 |
| 52 | −1.302162E−03 | 2.612866E−04 | −2.967063E−05 | 1.795663E−06 | −4.503650E−08 |
| 61 | 5.871624E−04 | −5.931083E−05 | 2.344098E−06 | 8.198097E−08 | −7.797658E−09 |
| 62 | 6.422065E−05 | −1.001461E−05 | 8.683068E−07 | −3.967017E−08 | 7.201310E−10 |
| 71 | 1.544024E−04 | −1.437032E−05 | 8.240031E−07 | −2.702261E−08 | 3.715680E−10 |
| 72 | 9.231063E−06 | −3.190667E−07 | −6.549100E−10 | 3.209970E−10 | −5.815000E−12 |
| 81 | −2.513572E−06 | 1.445037E−07 | −5.078488E−09 | 9.860700E−11 | −8.260000E−13 |
| 82 | 7.517129E−07 | −2.618058E−08 | 1.572180E−10 | 9.636000E−12 | −1.570000E−13 |

Third Embodiment

Please refer to FIG. 10 which illustrates the third embodiment of the optical imaging lens 1 of the present invention. Please refer to FIG. 11A for the longitudinal spherical aberration on the image plane 91 of the third embodiment; please refer to FIG. 11B for the field curvature aberration on the sagittal direction; please refer to FIG. 11C for the field curvature aberration on the tangential direction; and please refer to FIG. 11D for the distortion aberration. The components in this embodiment are similar to those in the first embodiment, but the optical data such as the curvature radius, the lens thickness, the aspheric surface or the back focal length in this embodiment are different from the optical data in the first embodiment. Besides, in this embodiment, the periphery region 47 of the image-side surface 42 of the fourth lens element 40 is concave, the periphery region 54 of the object-side surface 51 of the fifth lens element 50 is convex, the periphery region 57 of the image-side surface 52 of the fifth lens element 50 is concave, the periphery region 64 of the object-side surface 61 of the sixth lens element 60 is convex, the periphery region 67 of the image-side surface 62 of the sixth lens element 60 is concave.

The optical data of the third embodiment of the optical imaging lens are shown in TABLE 5 while the aspheric surface data are shown in TABLE 6. In this embodiment, EFL=8.044 mm; HFOV=35.977 degrees; TTL=8.304 mm; Fno=2.129; ImgH=6.700 mm. In particular: 1. The system length of the optical imaging lens TTL in this embodiment is shorter than the system length of the optical imaging lens TTL in the first embodiment; 2. The longitudinal spherical aberration in this embodiment is smaller than the longitudinal spherical aberration in the first embodiment; 3. The field curvature aberration on the sagittal direction in this embodiment is smaller than the field curvature aberration on the sagittal direction in the first embodiment; 4. The field curvature aberration on the tangential direction in this embodiment is smaller than the field curvature aberration on the tangential direction in the first embodiment; 5. The distortion aberration in this embodiment is smaller than the distortion aberration in the first embodiment.

TABLE 5

Third Embodiment
EFL = 8.044 mm; HFOV = 35.977 degrees; TTL = 8.304 mm; Fno = 2.129; ImgH = 6.700 mm

| No. | | Radius of Curvature (mm) | Ape. Stop Distance Lens Thickness Air Gap (mm) | | Material | Refractive Index | Abbe No. | Focal Length (mm) |
|---|---|---|---|---|---|---|---|---|
| | Object | Infinity | Infinity | | | | | |
| 99 | Ape. Stop | Infinity | −0.514 | | | | | |
| 11 | First Lens | 3.019 | 0.773 | T1 | Plastic | 1.545 | 55.987 | 8.554 |
| 12 | | 7.755 | 0.073 | G12 | | | | |
| 21 | Second Lens | 7.284 | 0.242 | T2 | Plastic | 1.671 | 19.480 | −40.439 |
| 22 | | 5.677 | 0.394 | G23 | | | | |
| 31 | Third Lens | 12.146 | 0.211 | T3 | Plastic | 1.671 | 19.480 | −25.291 |
| 32 | | 7.058 | 0.053 | G34 | | | | |
| 41 | Fourth Lens | 10.382 | 0.507 | T4 | Plastic | 1.545 | 55.987 | 10.635 |
| 42 | | −12.964 | 0.690 | G45 | | | | |
| 51 | Fifth Lens | −2.285 | 0.255 | T5 | Plastic | 1.545 | 55.987 | 11.756 |
| 52 | | −1.752 | 0.020 | G56 | | | | |
| 61 | Sixth Lens | 28.127 | 0.471 | T6 | Plastic | 1.661 | 20.373 | −12.022 |
| 62 | | 6.199 | 0.336 | G67 | | | | |
| 71 | Seventh Lens | 4.405 | 0.450 | T7 | Plastic | 1.545 | 55.987 | 11.255 |
| 72 | | 14.978 | 0.897 | G78 | | | | |

TABLE 5-continued

Third Embodiment
EFL = 8.044 mm; HFOV = 35.977 degrees; TTL = 8.304 mm; Fno = 2.129; ImgH = 6.700 mm

| No. | | Radius of Curvature (mm) | Ape. Stop Distance Lens Thickness Air Gap (mm) | Material | Refractive Index | Abbe No. | Focal Length (mm) |
|---|---|---|---|---|---|---|---|
| 81 | Eighth Lens | −4.373 | 0.210 | T8 Plastic | 1.545 | 55.987 | −4.820 |
| 82 | | 6.728 | 0.445 | G8F | | | |
| 90 | Filter | Infinity | 0.308 | TF | 1.560 | 51.300 | |
| | | Infinity | 1.969 | GFP | | | |
| 91 | Image Plane | Infinity | | | | | |

TABLE 6

| No. | K | $a_2$ | $a_4$ | $a_6$ | $a_8$ | $a_{10}$ |
|---|---|---|---|---|---|---|
| 11 | 1.023184E−02 | 0.000000E+00 | −1.364413E−03 | −9.976618E−04 | 1.235464E−03 | −8.468344E−04 |
| 12 | −1.034145E+01 | 0.000000E+00 | −1.859407E−02 | 4.991327E−03 | 8.029131E−04 | −1.549663E−03 |
| 21 | 1.254937E+01 | 0.000000E+00 | −3.312495E−02 | 8.860821E−03 | 5.430751E−04 | −2.298412E−03 |
| 22 | −3.289989E+00 | 0.000000E+00 | −1.068766E−02 | 3.331917E−03 | 4.421238E−03 | −5.236761E−03 |
| 31 | −2.998287E+02 | 0.000000E+00 | −2.442606E−02 | 1.838478E−02 | −2.179653E−02 | 1.408450E−02 |
| 32 | −6.352546E+01 | 0.000000E+00 | −4.012420E−02 | 3.496575E−02 | −2.994237E−02 | 1.561380E−02 |
| 41 | 2.455014E+01 | 0.000000E+00 | −3.987405E−02 | 3.272908E−02 | −2.532235E−02 | 1.325345E−02 |
| 42 | −1.134749E+02 | 0.000000E+00 | −1.156814E−02 | 6.487716E−04 | 2.072418E−03 | −1.681302E−03 |
| 51 | −3.167399E+00 | 0.000000E+00 | −1.151745E−02 | 3.765811E−02 | −3.020085E−02 | 1.604734E−02 |
| 52 | −2.530603E+00 | 0.000000E+00 | 3.925230E−02 | −1.263001E−02 | −1.936764E−03 | 3.492695E−03 |
| 61 | −9.969699E+39 | 0.000000E+00 | 3.423542E−02 | −3.148957E−02 | 1.290012E−02 | −3.386540E−03 |
| 62 | −9.755531E+01 | 0.000000E+00 | −8.713421E−03 | −1.475665E−03 | 4.874987E−04 | −2.018148E−04 |
| 71 | −2.599614E+01 | 0.000000E+00 | 6.355743E−03 | −1.356691E−02 | 4.192279E−03 | −1.089520E−03 |
| 72 | −2.322242E+01 | 0.000000E+00 | −1.153546E−03 | −3.684476E−03 | 8.204945E−04 | −1.164889E−04 |
| 81 | 5.080167E−01 | 0.000000E+00 | −1.700171E−02 | 2.583977E−03 | −2.506049E−04 | 3.061189E−05 |
| 82 | −1.622128E+39 | 0.000000E+00 | −8.104325E−03 | 7.880670E−04 | −6.485307E−05 | −5.057447E−06 |

| No. | $a_{12}$ | $a_{14}$ | $a_{16}$ | $a_{18}$ | $a_{20}$ |
|---|---|---|---|---|---|
| 11 | 3.015311E−04 | −5.846956E−05 | 5.216378E−06 | | |
| 12 | 7.343666E−04 | −1.644008E−04 | 1.533098E−05 | | |
| 21 | 1.040441E−03 | −2.217216E−04 | 1.920957E−05 | | |
| 22 | 2.329873E−03 | −5.364345E−04 | 5.192325E−05 | | |
| 31 | −5.742565E−03 | 1.257586E−03 | −1.117119E−04 | | |
| 32 | −4.859985E−03 | 8.310774E−04 | −6.067009E−05 | | |
| 41 | −3.820464E−03 | 5.784665E−04 | −3.583994E−05 | | |
| 42 | 8.304962E−04 | −1.807243E−04 | 1.701777E−05 | | |
| 51 | −5.551637E−03 | 1.251649E−03 | −1.750411E−04 | 1.390312E−05 | −4.878058E−07 |
| 52 | −1.298422E−03 | 2.606800E−04 | −2.966346E−05 | 1.795633E−06 | −7.338001E−09 |
| 61 | 5.830848E−04 | −5.831576E−05 | 2.781796E−06 | 1.282706E−07 | −2.684496E−08 |
| 62 | 6.912740E−05 | −9.478152E−06 | 8.928525E−07 | −3.515923E−08 | 3.751442E−09 |
| 71 | 1.536706E−04 | −1.409456E−05 | 9.419835E−07 | −3.473046E−08 | −1.373059E−08 |
| 72 | 9.271514E−06 | −3.162656E−07 | −4.807740E−10 | 3.258270E−10 | −7.264000E−12 |
| 81 | −2.422819E−06 | 1.518652E−07 | −3.762428E−09 | 3.987690E−10 | 5.681900E−11 |
| 82 | 8.272117E−07 | −2.343968E−08 | 1.932500E−10 | −4.879000E−12 | −2.920000E−12 |

Fourth Embodiment

Figure 12:
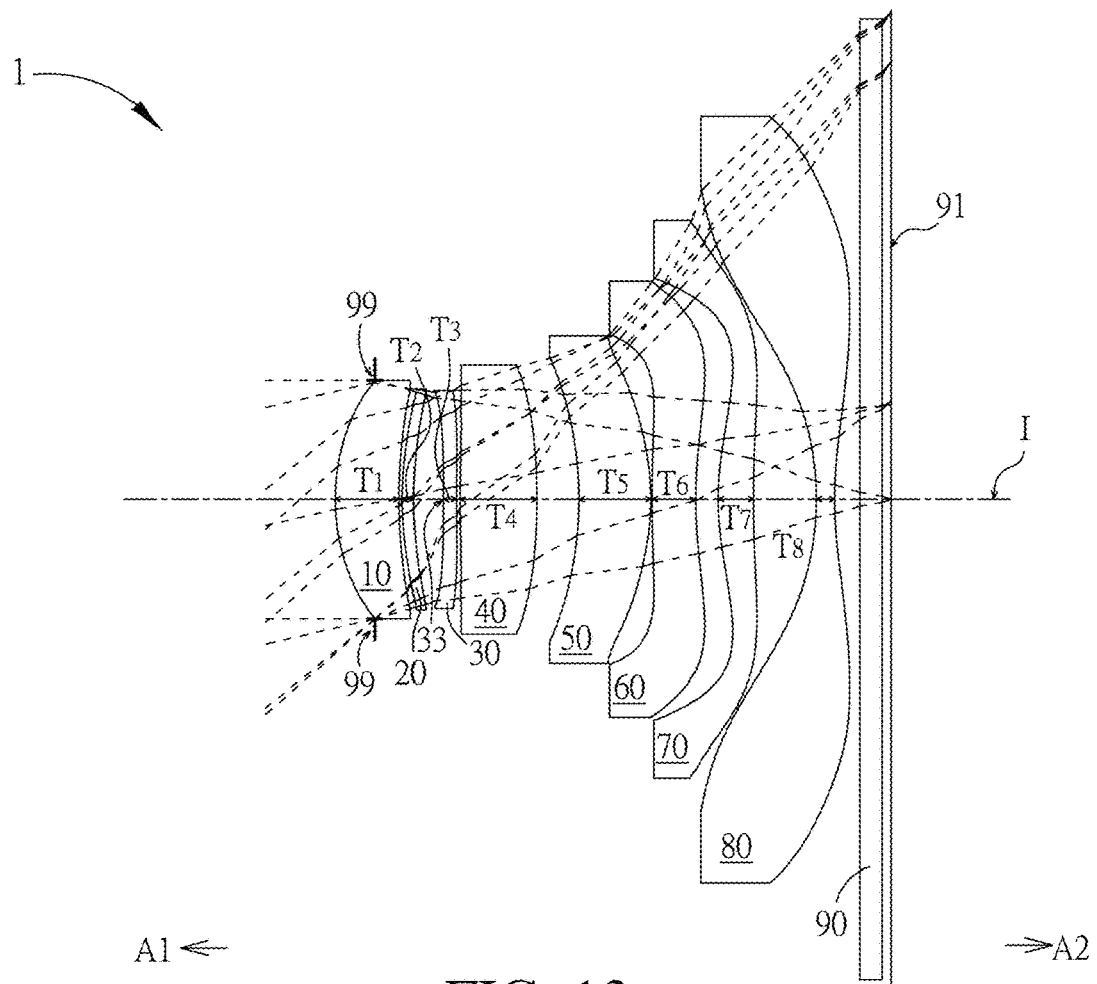
FIG. 12 illustrates a fourth embodiment of the optical imaging lens of the present invention.
Figure 13A:
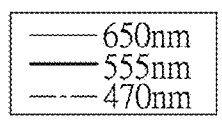
FIG. 13A illustrates the longitudinal spherical aberration on the image plane of the fourth embodiment.
Figure 13A:
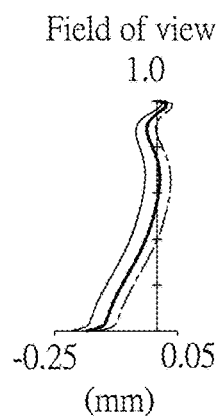
Figure 13B:
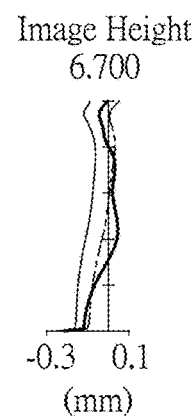
FIG. 13B illustrates the field curvature aberration on the sagittal direction of the fourth embodiment.
Figure 13C:
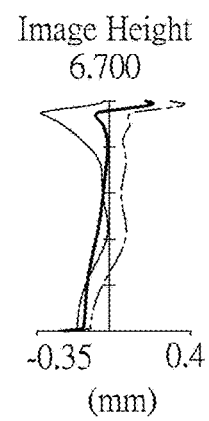
FIG. 13C illustrates the field curvature aberration on the tangential direction of the fourth embodiment.
Figure 13D:
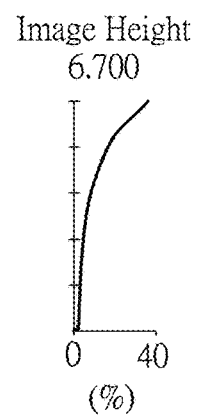
FIG. 13D illustrates the distortion of the fourth embodiment.

Please refer to FIG. 12 which illustrates the fourth embodiment of the optical imaging lens 1 of the present invention. Please refer to FIG. 13A for the longitudinal spherical aberration on the image plane 91 of the fourth embodiment; please refer to FIG. 13B for the field curvature aberration on the sagittal direction; please refer to FIG. 13C for the field curvature aberration on the tangential direction; and please refer to FIG. 13D for the distortion aberration. The components in this embodiment are similar to those in the first embodiment, but the optical data such as the curvature radius, the lens thickness, the aspheric surface or the back focal length in this embodiment are different from the optical data in the first embodiment. Besides, in this embodiment, the second lens element 20 has positive refracting power, the optical axis region 33 of the object-side surface 31 of the third lens element 30 is concave.

The optical data of the fourth embodiment of the optical imaging lens are shown in TABLE 7 while the aspheric surface data are shown in TABLE 8. In this embodiment, EFL=5.251 mm; HFOV=41.282 degrees; TTL=7.637 mm; Fno=1.600; ImgH=6.700 mm. In particular: 1. The system length of the optical imaging lens TTL in this embodiment is shorter than the system length of the optical imaging lens TTL in the first embodiment; 2. The HFOV in this embodiment is larger than the HFOV in the first embodiment; 3. The longitudinal spherical aberration in this embodiment is smaller than the longitudinal spherical aberration in the first embodiment; 4. The field curvature aberration on the sagittal direction in this embodiment is smaller than the field curvature aberration on the sagittal direction in the first embodiment; 5. The field curvature aberration on the tangential direction in this embodiment is smaller than the field curvature aberration on the tangential direction in the first embodiment.

TABLE 7

Fourth Embodiment
EFL = 5.251 mm; HFOV = 41.282 degrees; TTL = 7.637 mm; Fno = 1.600; ImgH = 6.700 mm

| No. | | Radius of Curvature (mm) | Ape. Stop Distance Lens Thickness Air Gap (mm) | | Material | Refractive Index | Abbe No. | Focal Length (mm) |
|---|---|---|---|---|---|---|---|---|
|  | Object | Infinity | Infinity |  |  |  |  |  |
| 99 | Ape. Stop | Infinity | −0.545 |  |  |  |  |  |
| 11 | First Lens | 2.948 | 0.876 | T1 | Plastic | 1.545 | 55.987 | 8.768 |
| 12 |  | 6.860 | 0.044 | G12 |  |  |  |  |
| 21 | Second Lens | 4.459 | 0.152 | T2 | Plastic | 1.671 | 19.480 | 28.209 |
| 22 |  | 5.737 | 0.410 | G23 |  |  |  |  |
| 31 | Third Lens | −57.792 | 0.181 | T3 | Plastic | 1.671 | 19.480 | −23.609 |
| 32 |  | 22.145 | 0.051 | G34 |  |  |  |  |
| 41 | Fourth Lens | 17.317 | 1.055 | T4 | Plastic | 1.545 | 55.987 | 10.641 |
| 42 |  | −8.562 | 0.579 | G45 |  |  |  |  |
| 51 | Fifth Lens | −5.538 | 0.992 | T5 | Plastic | 1.545 | 55.987 | 12.047 |
| 52 |  | −3.198 | 0.020 | G56 |  |  |  |  |
| 61 | Sixth Lens | 48.756 | 0.590 | T6 | Plastic | 1.661 | 20.373 | −11.567 |
| 62 |  | 6.630 | 0.310 | G67 |  |  |  |  |
| 71 | Seventh Lens | 4.145 | 0.483 | T7 | Plastic | 1.545 | 55.987 | 10.088 |
| 72 |  | 16.037 | 0.867 | G78 |  |  |  |  |
| 81 | Eighth Lens | −4.332 | 0.253 | T8 | Plastic | 1.545 | 55.987 | −4.385 |
| 82 |  | 5.467 | 0.345 | G8F |  |  |  |  |
| 90 | Filter | Infinity | 0.308 | TF |  | 1.560 | 51.300 |  |
|  |  | Infinity | 0.122 | GFP |  |  |  |  |
| 91 | Image Plane | Infinity |  |  |  |  |  |  |

TABLE 8

| No. | K | $a_2$ | $a_4$ | $a_6$ | $a_8$ | $a_{10}$ |
|---|---|---|---|---|---|---|
| 11 | 3.494203E−01 | 0.000000E+00 | 1.974136E−03 | −5.992147E−04 | 1.432642E−03 | −8.053319E−04 |
| 12 | 5.058850E+00 | 0.000000E+00 | −1.452771E−02 | 5.825464E−03 | 8.507068E−04 | −1.614718E−03 |
| 21 | 6.435818E+00 | 0.000000E+00 | −3.635969E−02 | 7.495342E−03 | 6.731044E−05 | −2.424600E−03 |
| 22 | −2.622490E+00 | 0.000000E+00 | −1.050034E−02 | 3.546366E−03 | 4.726315E−03 | −5.166717E−03 |
| 31 | 1.398970E+03 | 0.000000E+00 | −2.231484E−02 | 1.927545E−02 | −2.188090E−02 | 1.406606E−02 |
| 32 | −3.076255E+01 | 0.000000E+00 | −4.093280E−02 | 3.501457E−02 | −2.988820E−02 | 1.561717E−02 |
| 41 | 5.189928E+01 | 0.000000E+00 | −3.689723E−02 | 3.250382E−02 | −2.550073E−02 | 1.319973E−02 |
| 42 | −7.842434E+01 | 0.000000E+00 | −1.493816E−02 | −2.040341E−04 | 1.874565E−03 | −1.734079E−03 |
| 51 | 1.004490E+00 | 0.000000E+00 | −2.395536E−02 | 3.535761E−02 | −3.018911E−02 | 1.606280E−02 |
| 52 | −4.353357E−01 | 0.000000E+00 | 3.664732E−02 | −1.280887E−02 | −2.245951E−03 | 3.437172E−03 |
| 61 | −4.268938E+08 | 0.000000E+00 | 4.060607E−02 | −3.338184E−02 | 1.247342E−02 | −3.391573E−03 |
| 62 | −6.275187E+00 | 0.000000E+00 | −5.785360E−03 | −1.641268E−03 | 4.593426E−04 | −2.272748E−04 |
| 71 | −1.947166E+01 | 0.000000E+00 | 1.229054E−02 | −1.256650E−02 | 4.449148E−03 | −1.050905E−03 |
| 72 | −9.153839E+00 | 0.000000E+00 | 8.571993E−04 | −3.496638E−03 | 8.141502E−04 | −1.169444E−04 |
| 81 | −4.165156E−01 | 0.000000E+00 | −1.152837E−02 | 2.463645E−03 | −2.698141E−04 | 2.909896E−05 |
| 82 | −4.215540E−01 | 0.000000E+00 | −1.733166E−02 | 1.700462E−03 | −6.122416E−05 | −6.592040E−06 |

| No. | $a_{12}$ | $a_{14}$ | $a_{16}$ | $a_{18}$ | $a_{20}$ |
|---|---|---|---|---|---|
| 11 | 3.104989E−04 | −5.817580E−05 | 5.183735E−06 |  |  |
| 12 | 6.982913E−04 | −1.729458E−04 | 1.849331E−05 |  |  |
| 21 | 1.017441E−03 | −2.376096E−04 | 2.609938E−06 |  |  |
| 22 | 2.308074E−03 | −5.519403E−04 | 5.165684E−05 |  |  |
| 31 | −5.726146E−03 | 1.262894E−03 | −1.231627E−04 |  |  |
| 32 | −4.862722E−03 | 8.318246E−04 | −5.768281E−05 |  |  |
| 41 | −3.832684E−03 | 5.763039E−04 | −3.543362E−05 |  |  |
| 42 | 8.116741E−04 | −1.855253E−04 | 1.584319E−05 |  |  |
| 51 | −5.551236E−03 | 1.250401E−03 | −1.754806E−04 | 1.383579E−05 | −4.892912E−07 |
| 52 | −1.300672E−03 | 2.615139E−04 | −2.964191E−05 | 1.798819E−06 | −4.493714E−08 |
| 61 | 5.859492E−04 | −5.925252E−05 | 2.369070E−06 | 7.306756E−08 | −1.390566E−08 |
| 62 | 6.408983E−05 | −1.002010E−05 | 8.687126E−07 | −3.951419E−08 | 7.725220E−10 |
| 71 | 1.542729E−04 | −1.436632E−05 | 8.255780E−07 | −2.685294E−08 | 3.859480E−10 |
| 72 | 9.242459E−06 | −3.188526E−07 | −6.631760E−10 | 3.170570E−10 | −5.902000E−12 |
| 81 | −2.515256E−06 | 1.444745E−07 | −5.078592E−09 | 9.878200E−11 | −8.140000E−13 |
| 82 | 7.512120E−07 | −2.619831E−08 | 1.567220E−10 | 9.639000E−12 | −1.560000E−13 |

Fifth Embodiment

Figure 14:
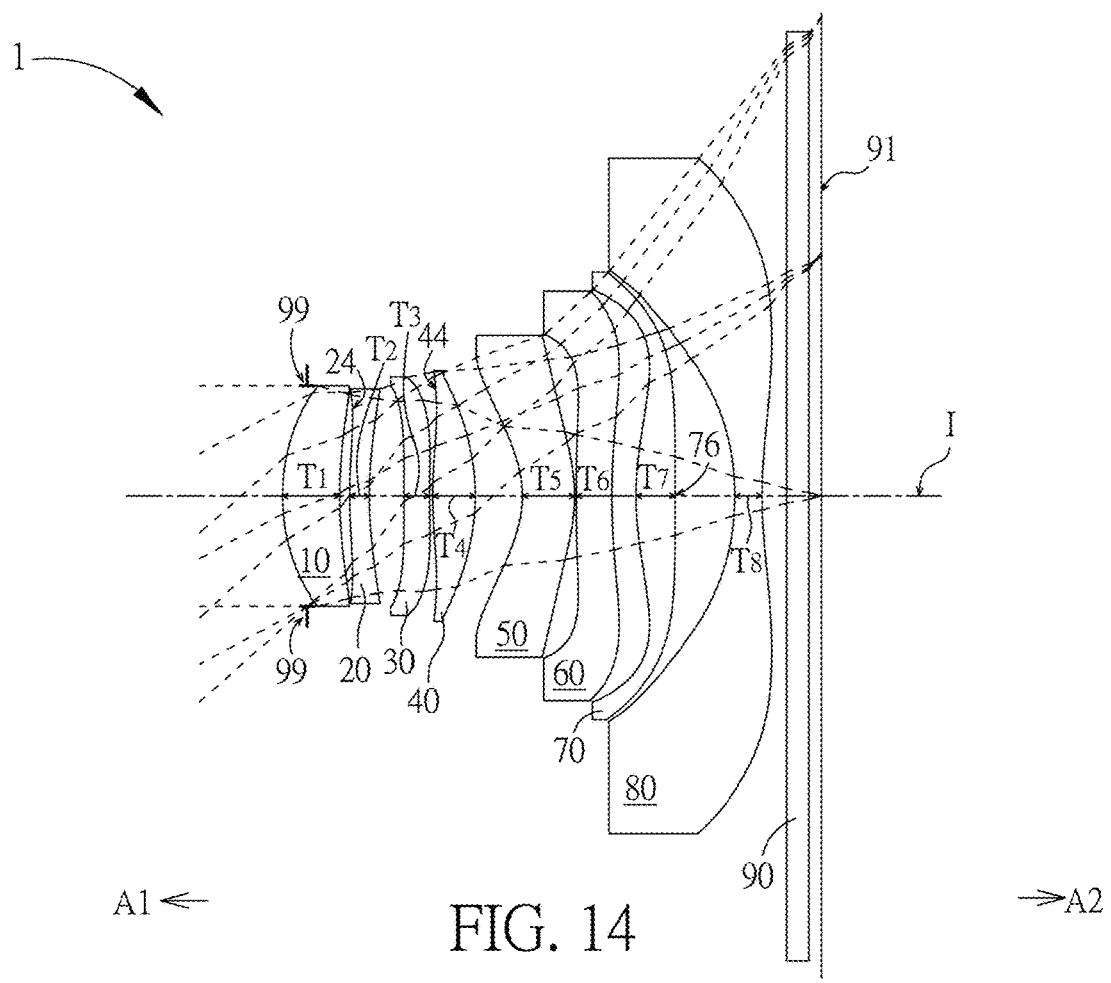
FIG. 14 illustrates a fifth embodiment of the optical imaging lens of the present invention.
Figure 15A:
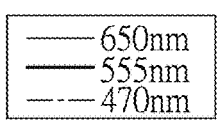
FIG. 15A illustrates the longitudinal spherical aberration on the image plane of the fifth embodiment.
Figure 15A:
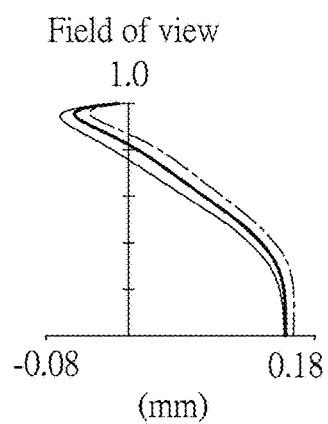
Figure 15B:
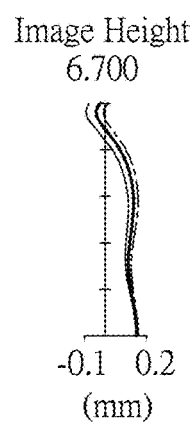
FIG. 15B illustrates the field curvature aberration on the sagittal direction of the fifth embodiment.
Figure 15C:
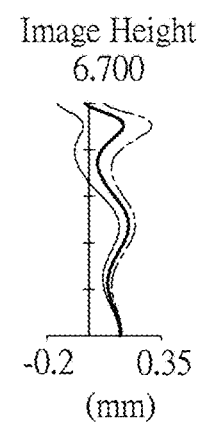
FIG. 15C illustrates the field curvature aberration on the tangential direction of the fifth embodiment.
Figure 15D:
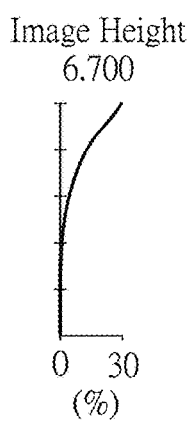
FIG. 15D illustrates the distortion of the fifth embodiment.

Please refer to FIG. 14 which illustrates the fifth embodiment of the optical imaging lens 1 of the present invention. Please refer to FIG. 15A for the longitudinal spherical aberration on the image plane 91 of the fifth embodiment; please refer to FIG. 15B for the field curvature aberration on the sagittal direction; please refer to FIG. 15C for the field curvature aberration on the tangential direction, and please refer to FIG. 15D for the distortion aberration. The components in this embodiment are similar to those in the first embodiment, but the optical data such as the curvature radius, the lens thickness, the aspheric surface or the back focal length in this embodiment are different from the optical data in the first embodiment. Besides, in this embodiment, the periphery region 24 of the object-side surface 21 of the second lens element 20 is concave, the periphery region 44 of the object-side surface 41 of the fourth lens element 40 is concave, the fifth lens element 50 has negative refracting power, the optical axis region 76 of the image-side surface 72 of the seventh lens element 70 is convex.

The optical data of the fifth embodiment of the optical imaging lens are shown in TABLE 9 while the aspheric surface data are shown in TABLE 10. In this embodiment, EFL=4.929 mm; HFOV=41.697 degrees; TTL=7.519 mm; Fno=1.600; ImgH=6.700 mm. In particular: 1. The system length of the optical imaging lens TTL in this embodiment is shorter than the system length of the optical imaging lens TTL in the first embodiment; 2. The HFOV in this embodiment is larger than the HFOV in the first embodiment; 3. The longitudinal spherical aberration in this embodiment is smaller than the longitudinal spherical aberration in the first embodiment; 4. The field curvature aberration on the sagittal direction in this embodiment is smaller than the field curvature aberration on the sagittal direction in the first embodiment; 5. The field curvature aberration on the tangential direction in this embodiment is smaller than the field curvature aberration on the tangential direction in the first embodiment.

TABLE 9

Fifth Embodiment
EFL = 4.929 mm; HFOV = 41.697 degrees; TTL = 7.519 mm; Fno = 1.600; ImgH = 6.700 mm

| No. | | Radius of Curvature (mm) | Ape. Stop Distance Lens Thickness Air Gap (mm) | | Material | Refractive Index | Abbe No. | Focal Length (mm) |
|---|---|---|---|---|---|---|---|---|
| | Object | Infinity | Infinity | | | | | |
| 99 | Ape. Stop | Infinity | −0.342 | | | | | |
| 11 | First Lens | 2.836 | 0.799 | T1 | Plastic | 1.545 | 55.987 | 8.700 |
| 12 | | 6.334 | 0.140 | G12 | | | | |
| 21 | Second Lens | 7.310 | 0.273 | T2 | Plastic | 1.671 | 19.480 | −35.820 |
| 22 | | 5.533 | 0.487 | G23 | | | | |
| 31 | Third Lens | 33.034 | 0.347 | T3 | Plastic | 1.671 | 19.480 | −23.949 |
| 32 | | 10.835 | 0.044 | G34 | | | | |
| 41 | Fourth Lens | 5.491 | 0.596 | T4 | Plastic | 1.545 | 55.987 | 3.536 |
| 42 | | −2.865 | 0.658 | G45 | | | | |
| 51 | Fifth Lens | −1.510 | 0.731 | T5 | Plastic | 1.545 | 55.987 | −11.724 |
| 52 | | −2.313 | 0.023 | G56 | | | | |
| 61 | Sixth Lens | 35.273 | 0.496 | T6 | Plastic | 1.661 | 20.373 | −20.710 |
| 62 | | 9.872 | 0.338 | G67 | | | | |
| 71 | Seventh Lens | 4.586 | 0.547 | T7 | Plastic | 1.545 | 55.987 | 8.159 |
| 72 | | −151.691 | 0.825 | G78 | | | | |
| 81 | Eighth Lens | −3.719 | 0.382 | T8 | Plastic | 1.545 | 55.987 | −4.265 |
| 82 | | 6.464 | 0.345 | G8F | | | | |
| 90 | Filter | Infinity | 0.308 | TF | | 1.560 | 51.300 | |
| | | Infinity | 0.178 | GFP | | | | |
| 91 | Image Plane | Infinity | | | | | | |

TABLE 10

| No. | K | $a_2$ | $a_4$ | $a_6$ | $a_8$ | $a_{10}$ |
|---|---|---|---|---|---|---|
| 11 | 3.707067E−01 | 0.000000E+00 | 1.817159E−03 | −8.445305E−04 | 1.378986E−03 | −8.285857E−04 |
| 12 | 3.087269E+00 | 0.000000E+00 | −1.419580E−02 | 4.882125E−03 | 6.016251E−04 | −1.779113E−03 |
| 21 | 7.287819E+00 | 0.000000E+00 | −3.811171E−02 | 7.279215E−03 | 3.581582E−04 | −2.363994E−03 |
| 22 | −5.555253E+00 | 0.000000E+00 | −1.589574E−02 | 3.428466E−03 | 4.699769E−03 | −5.212828E−03 |
| 31 | −7.050612E+38 | 0.000000E+00 | −3.678164E−02 | 2.340149E−02 | −2.303944E−02 | 1.358757E−02 |
| 32 | −2.790801E+02 | 0.000000E+00 | −6.961404E−02 | 3.660232E−02 | −2.856604E−02 | 1.483784E−02 |
| 41 | 6.882476E+00 | 0.000000E+00 | −6.443070E−02 | 3.336325E−02 | −2.637554E−02 | 1.336065E−02 |
| 42 | −1.277643E+01 | 0.000000E+00 | −2.359573E−02 | 5.221882E−04 | 1.818560E−03 | −1.730014E−03 |
| 51 | −3.607576E+00 | 0.000000E+00 | −1.856145E−02 | 3.497897E−02 | −2.975864E−02 | 1.606401E−02 |
| 52 | −3.653150E+00 | 0.000000E+00 | 4.742976E−02 | −1.350776E−02 | −2.209992E−03 | 3.394645E−03 |
| 61 | −5.540466E+38 | 0.000000E+00 | 4.007335E−02 | −3.087251E−02 | 1.168769E−02 | −3.208298E−03 |
| 62 | −8.114856E−01 | 0.000000E+00 | −1.375503E−03 | −1.890679E−03 | 4.739614E−04 | −2.274528E−04 |
| 71 | −1.667286E+01 | 0.000000E+00 | 1.199614E−02 | −1.280188E−02 | 4.467212E−03 | −1.048996E−03 |
| 72 | 1.278678E+03 | 0.000000E+00 | 2.094291E−04 | −3.669454E−03 | 8.066098E−04 | −1.159090E−04 |

TABLE 10-continued

| | | | | | |
|---|---|---|---|---|---|
| 81 | −6.605174E−01 | 0.000000E+00 | −1.355233E−02 | 2.459479E−03 | −2.567677E−04 | 2.831094E−05 |
| 82 | −3.766016E−01 | 0.000000E+00 | −1.672759E−02 | 1.658651E−03 | −6.044314E−05 | −6.609400E−06 |

| No. | $a_{12}$ | $a_{14}$ | $a_{16}$ | $a_{18}$ | $a_{20}$ |
|---|---|---|---|---|---|
| 11 | 3.257875E−04 | −5.717723E−05 | 6.367979E−06 | | |
| 12 | 8.375829E−04 | −1.871311E−04 | −1.434557E−05 | | |
| 21 | 9.992230E−04 | −2.338561E−04 | 8.582438E−06 | | |
| 22 | 2.391327E−03 | −6.319210E−04 | 8.807272E−05 | | |
| 31 | −5.411953E−03 | 1.204998E−03 | −1.250529E−04 | | |
| 32 | −4.743186E−03 | 8.230653E−04 | −6.753672E−05 | | |
| 41 | −3.874415E−03 | 5.850888E−04 | −3.630201E−05 | | |
| 42 | 8.260992E−04 | −1.797590E−04 | 1.773063E−05 | | |
| 51 | −5.557269E−03 | 1.250294E−03 | −1.753758E−04 | 1.385731E−05 | −4.742074E−07 |
| 52 | −1.302994E−03 | 2.619146E−04 | −2.967039E−05 | 1.781164E−06 | −4.213716E−08 |
| 61 | 5.713157E−04 | −6.129957E−05 | 2.531929E−06 | 1.381506E−07 | −2.147155E−08 |
| 62 | 6.407056E−05 | −1.000452E−05 | 8.693196E−07 | −3.968103E−08 | 7.580610E−10 |
| 71 | 1.541648E−04 | −1.440536E−05 | 8.261450E−07 | −2.646490E−08 | 3.495620E−10 |
| 72 | 9.204409E−06 | −3.152099E−07 | −7.944580E−10 | 3.166950E−10 | −7.678000E−12 |
| 81 | −2.671783E−06 | 1.395223E−07 | −4.940884E−09 | 1.492620E−10 | −7.783000E−12 |
| 82 | 7.524633E−07 | −2.620295E−08 | 1.559600E−10 | 9.635000E−12 | −1.590000E−13 |

Sixth Embodiment

Please refer to FIG. 16 which illustrates the sixth embodiment of the optical imaging lens 1 of the present invention. Please refer to FIG. 17A for the longitudinal spherical aberration on the image plane 91 of the sixth embodiment; please refer to FIG. 17B for the field curvature aberration on the sagittal direction; please refer to FIG. 17C for the field curvature aberration on the tangential direction, and please refer to FIG. 17D for the distortion aberration. The components in this embodiment are similar to those in the first embodiment, but the optical data such as the curvature radius, the lens thickness, the aspheric surface or the back focal length in this embodiment are different from the optical data in the first embodiment. Besides, in this embodiment, the periphery region 37 of the image-side surface 32 of the third lens element 30 is concave, the optical axis region 43 of the object-side surface 41 of the fourth lens element 40 is concave, the periphery region 44 of the object-side surface 41 of the fourth lens element 40 is concave, the fifth lens element 50 has negative refracting power, the optical axis region 76 of the image-side surface 72 of the seventh lens element 70 is convex.

The optical data of the sixth embodiment of the optical imaging lens are shown in TABLE 11 while the aspheric surface data are shown in TABLE 12. In this embodiment, EFL=6.230 mm; HFOV=41.562 degrees; TTL=7.798 mm; Fno=1.999; ImgH=5.800 mm. In particular: 1. The system length of the optical imaging lens TTL in this embodiment is shorter than the system length of the optical imaging lens TTL in the first embodiment; 2. The HFOV in this embodiment is larger than the HFOV in the first embodiment; 3. The longitudinal spherical aberration in this embodiment is smaller than the longitudinal spherical aberration in the first embodiment; 4. The field curvature aberration on the sagittal direction in this embodiment is smaller than the field curvature aberration on the sagittal direction in the first embodiment; 5. The field curvature aberration on the tangential direction in this embodiment is smaller than the field curvature aberration on the tangential direction in the first embodiment; 6. The distortion aberration in this embodiment is smaller than the distortion aberration in the first embodiment.

TABLE 11

Sixth Embodiment
EFL = 6.230 mm; HFOV = 41.562 degrees; TTL = 7.798 mm; Fno = 1.999; ImgH = 5.800 mm

| No. | | Radius of Curvature (mm) | Ape. Stop Distance Lens Thickness Air Gap (mm) | | Material | Refractive Index | Abbe No. | Focal Length (mm) |
|---|---|---|---|---|---|---|---|---|
| | Object | Infinity | Infinity | | | | | |
| 99 | Ape. Stop | Infinity | −0.509 | | | | | |
| 11 | First Lens | 2.590 | 0.861 | T1 | Plastic | 1.545 | 55.987 | 5.892 |
| 12 | | 11.705 | 0.049 | G12 | | | | |
| 21 | Second Lens | 8.912 | 0.384 | T2 | Plastic | 1.671 | 19.243 | −18.713 |
| 22 | | 5.143 | 0.562 | G23 | | | | |
| 31 | Third Lens | 33.586 | 0.309 | T3 | Plastic | 1.671 | 19.243 | −111.926 |
| 32 | | 23.190 | 0.184 | G34 | | | | |
| 41 | Fourth Lens | −136.884 | 0.531 | T4 | Plastic | 1.545 | 55.987 | 23.811 |
| 42 | | −11.895 | 0.256 | G45 | | | | |
| 51 | Fifth Lens | −20.255 | 0.275 | T5 | Plastic | 1.671 | 19.243 | −34.665 |
| 52 | | −148.000 | 0.477 | G56 | | | | |
| 61 | Sixth Lens | 16.196 | 0.281 | T6 | Plastic | 1.535 | 55.690 | −47.210 |
| 62 | | 9.820 | 0.177 | G67 | | | | |
| 71 | Seventh Lens | 7.344 | 1.132 | T7 | Plastic | 1.545 | 55.987 | 5.184 |
| 72 | | −4.358 | 0.765 | G78 | | | | |

TABLE 11-continued

Sixth Embodiment
EFL = 6.230 mm; HFOV = 41.562 degrees; TTL = 7.798 mm; Fno = 1.999; ImgH = 5.800 mm

| No. | | Radius of Curvature (mm) | Ape. Stop Distance Lens Thickness Air Gap (mm) | | Material | Refractive Index | Abbe No. | Focal Length (mm) |
|---|---|---|---|---|---|---|---|---|
| 81 | Eighth Lens | −6.769 | 0.587 | T8 | Plastic | 1.535 | 55.690 | −3.691 |
| 82 | | 2.884 | 0.600 | G8F | | | | |
| 90 | Filter | Infinity | 0.210 | TF | | 1.517 | 64.167 | |
|    |        | Infinity | 0.159 | GFP | | | | |
| 91 | Image Plane | Infinity | | | | | | |

15

TABLE 12

| No. | K | $a_2$ | $a_4$ | $a_6$ | $a_8$ | $a_{10}$ |
|---|---|---|---|---|---|---|
| 11 | 4.159884E−02 | 0.000000E+00 | 7.843019E−04 | 7.555516E−04 | −1.000964E−03 | 9.372035E−04 |
| 12 | 0.000000E+00 | 0.000000E+00 | −1.786353E−02 | 1.547241E−02 | −6.097144E−03 | 1.445518E−04 |
| 21 | 0.000000E+00 | 0.000000E+00 | −1.760197E−02 | 1.701723E−02 | −5.199524E−03 | −8.613397E−04 |
| 22 | 8.080777E+00 | 0.000000E+00 | −7.946332E−03 | 5.350299E−03 | −2.239925E−03 | 8.477370E−04 |
| 31 | 0.000000E+00 | 0.000000E+00 | −1.877327E−02 | −3.469455E−03 | 7.240402E−03 | −7.477167E−03 |
| 32 | 0.000000E+00 | 0.000000E+00 | −1.630149E−02 | −1.004390E−02 | 1.307042E−02 | −8.866850E−03 |
| 41 | 0.000000E+00 | 0.000000E+00 | −4.745066E−03 | −2.039266E−02 | 1.472467E−02 | −6.362637E−03 |
| 42 | 0.000000E+00 | 0.000000E+00 | 5.447048E−03 | −3.136875E−02 | 1.541676E−02 | −3.649280E−03 |
| 51 | 0.000000E+00 | 0.000000E+00 | −4.217003E−03 | −3.363523E−02 | 5.710972E−03 | 7.364350E−03 |
| 52 | 0.000000E+00 | 0.000000E+00 | −8.490085E−03 | −2.062980E−02 | 1.961741E−03 | 6.326655E−03 |
| 61 | 0.000000E+00 | 0.000000E+00 | −1.092704E−02 | −3.766869E−03 | 3.293623E−04 | 8.379732E−04 |
| 62 | 0.000000E+00 | 0.000000E+00 | −1.834045E−02 | −1.678840E−02 | 9.879381E−03 | −2.756296E−03 |
| 71 | 0.000000E+00 | 0.000000E+00 | 3.615789E−03 | −1.520689E−02 | 5.728163E−03 | −1.248051E−03 |
| 72 | −1.194594E+01 | 0.000000E+00 | 1.504965E−02 | −4.197206E−05 | −2.109867E−03 | 6.659312E−04 |
| 81 | −4.316765E−01 | 0.000000E+00 | −2.304035E−02 | 5.053184E−03 | −1.131238E−03 | 1.635175E−04 |
| 82 | −7.522302E+00 | 0.000000E+00 | −1.890029E−02 | 4.244651E−03 | −7.647801E−04 | 9.580320E−05 |

| No. | $a_{12}$ | $a_{14}$ | $a_{16}$ | $a_{18}$ | $a_{20}$ |
|---|---|---|---|---|---|
| 11 | −5.175611E−04 | 1.447465E−04 | −1.843169E−05 | | |
| 12 | 8.152503E−04 | −2.844053E−04 | 2.910310E−05 | | |
| 21 | 1.520238E−03 | −4.924088E−04 | 5.619140E−05 | | |
| 22 | −3.413345E−04 | 1.578666E−04 | −2.416600E−05 | | |
| 31 | 3.994020E−03 | −1.042858E−03 | 1.132632E−04 | | |
| 32 | 3.298054E−03 | −5.427265E−04 | 3.115440E−05 | | |
| 41 | 1.155822E−03 | 4.046497E−05 | −2.153848E−05 | | |
| 42 | −5.730697E−05 | 1.663427E−04 | −1.930760E−05 | | |
| 51 | −4.604125E−03 | 1.038858E−03 | −8.441335E−05 | | |
| 52 | −3.830133E−03 | 1.035995E−03 | −1.483016E−04 | 1.082181E−05 | −3.107183E−07 |
| 61 | −3.882446E−04 | 7.843224E−05 | −8.639748E−06 | 5.192383E−07 | −1.347658E−08 |
| 62 | 4.671819E−04 | −4.917307E−05 | 3.101094E−06 | −1.059364E−07 | 1.465554E−09 |
| 71 | 1.343763E−04 | −7.762097E−08 | −1.566220E−06 | 1.499652E−07 | −4.604527E−09 |
| 72 | −1.136508E−04 | 1.217148E−05 | −8.158275E−07 | 3.138670E−08 | −5.271090E−10 |
| 81 | −1.257633E−05 | 4.874336E−07 | −6.727909E−09 | −9.879400E−11 | 2.938000E−12 |
| 82 | −8.185006E−06 | 4.643745E−07 | −1.664379E−08 | 3.385840E−10 | −2.958000E−12 |

Seventh Embodiment

Please refer to FIG. 18 which illustrates the seventh embodiment of the optical imaging lens 1 of the present invention. Please refer to FIG. 19A for the longitudinal spherical aberration on the image plane 91 of the seventh embodiment; please refer to FIG. 19B for the field curvature aberration on the sagittal direction; please refer to FIG. 19C for the field curvature aberration on the tangential direction, and please refer to FIG. 19D for the distortion aberration. The components in this embodiment are similar to those in the first embodiment, but the optical data such as the curvature radius, the lens thickness, the aspheric surface or the back focal length in this embodiment are different from the optical data in the first embodiment. Besides, in this embodiment, the optical axis region 43 of the object-side surface 41 of the fourth lens element 40 is concave, the periphery region 44 of the object-side surface 41 of the fourth lens element 40 is concave, the fifth lens element 50 has negative refracting power, the optical axis region 76 of the image-side surface 72 of the seventh lens element 70 is convex.

The optical data of the seventh embodiment of the optical imaging lens are shown in TABLE 13 while the aspheric surface data are shown in TABLE 14. In this embodiment, EFL=6.104 mm; HFOV=42.143 degrees; TTL=7.798 mm; Fno=1.999; ImgH=5.800 mm. In particular: 1. The system length of the optical imaging lens TTL in this embodiment is shorter than the system length of the optical imaging lens TTL in the first embodiment; 2. The HFOV in this embodiment is larger than the HFOV in the first embodiment; 3. The longitudinal spherical aberration in this embodiment is smaller than the longitudinal spherical aberration in the first embodiment; 4. The field curvature aberration on the sagittal direction in this embodiment is smaller than the field curvature aberration on the sagittal direction in the first embodiment; 5. The field curvature aberration on the tangential direction in this embodiment is smaller than the field curvature aberration on the tangential direction in the first embodiment; 6. The distortion aberration in this embodiment is smaller than the distortion aberration in the first embodiment.

TABLE 13

Seventh Embodiment
EFL = 6.104 mm; HFOV = 42.143 degrees; TTL = 7.798 mm; Fno = 1.999; ImgH = 5.800 mm

| No. | | Radius of Curvature (mm) | Ape. Stop Distance Lens Thickness Air Gap (mm) | | Material | Refractive Index | Abbe No. | Focal Length (mm) |
|---|---|---|---|---|---|---|---|---|
|  | Object | Infinity | Infinity |  |  |  |  |  |
| 99 | Ape. Stop | Infinity | −0.484 |  |  |  |  |  |
| 11 | First Lens | 2.621 | 0.781 | T1 | Plastic | 1.545 | 55.987 | 6.020 |
| 12 |  | 11.555 | 0.051 | G12 |  |  |  |  |
| 21 | Second Lens | 9.014 | 0.280 | T2 | Plastic | 1.671 | 19.243 | −19.651 |
| 22 |  | 5.307 | 0.471 | G23 |  |  |  |  |
| 31 | Third Lens | 41.937 | 0.280 | T3 | Plastic | 1.636 | 23.972 | −127.851 |
| 32 |  | 27.658 | 0.148 | G34 |  |  |  |  |
| 41 | Fourth Lens | −92.574 | 0.568 | T4 | Plastic | 1.545 | 55.987 | 24.068 |
| 42 |  | −11.538 | 0.280 | G45 |  |  |  |  |
| 51 | Fifth Lens | −20.880 | 0.291 | T5 | Plastic | 1.671 | 19.243 | −31.240 |
| 52 |  | −1550.721 | 0.437 | G56 |  |  |  |  |
| 61 | Sixth Lens | 13.226 | 0.428 | T6 | Plastic | 1.535 | 55.690 | −72.259 |
| 62 |  | 9.750 | 0.369 | G67 |  |  |  |  |
| 71 | Seventh Lens | 7.828 | 1.175 | T7 | Plastic | 1.545 | 55.987 | 4.470 |
| 72 |  | −3.361 | 0.761 | G78 |  |  |  |  |
| 81 | Eighth Lens | −6.251 | 0.385 | T8 | Plastic | 1.535 | 55.690 | −3.334 |
| 82 |  | 2.560 | 0.600 | G8F |  |  |  |  |
| 90 | Filter | Infinity | 0.210 | TF |  | 1.517 | 64.167 |  |
|  |  | Infinity | 0.284 | GFP |  |  |  |  |
| 91 | Image Plane | Infinity |  |  |  |  |  |  |

TABLE 14

| No. | K | $a_2$ | $a_4$ | $a_6$ | $a_8$ | $a_{10}$ |
|---|---|---|---|---|---|---|
| 11 | 8.776358E−02 | 0.000000E+00 | 9.214906E−04 | 1.208986E−03 | −1.439748E−03 | 1.339594E−03 |
| 12 | 0.000000E+00 | 0.000000E+00 | −1.618759E−02 | 1.885630E−02 | −1.521084E−02 | 9.603179E−03 |
| 21 | 0.000000E+00 | 0.000000E+00 | −1.814708E−02 | 2.156260E−02 | −1.381287E−02 | 7.001048E−03 |
| 22 | 7.823432E+00 | 0.000000E+00 | −1.005431E−02 | 8.617197E−03 | −6.965256E−03 | 4.992532E−03 |
| 31 | 0.000000E+00 | 0.000000E+00 | −1.823097E−02 | −3.901818E−03 | 8.982651E−03 | −1.051129E−02 |
| 32 | 0.000000E+00 | 0.000000E+00 | −1.490230E−02 | −1.296147E−02 | 1.803675E−02 | −1.494415E−02 |
| 41 | 0.000000E+00 | 0.000000E+00 | −4.158343E−03 | −2.108754E−02 | 1.880522E−02 | −1.268879E−02 |
| 42 | 0.000000E+00 | 0.000000E+00 | 1.859989E−03 | −3.094672E−02 | 2.295400E−02 | −1.175431E−02 |
| 51 | 0.000000E+00 | 0.000000E+00 | −2.698235E−03 | −5.200045E−02 | 3.501114E−02 | −1.366590E−02 |
| 52 | 0.000000E+00 | 0.000000E+00 | 5.216375E−04 | −4.459173E−02 | 3.249088E−02 | −1.449968E−02 |
| 61 | 0.000000E+00 | 0.000000E+00 | −6.173496E−03 | −1.672498E−02 | 1.139674E−02 | −4.228673E−03 |
| 62 | 0.000000E+00 | 0.000000E+00 | −2.204927E−02 | −9.894443E−03 | 6.567040E−03 | −1.887581E−03 |
| 71 | 0.000000E+00 | 0.000000E+00 | −2.733887E−03 | −3.329535E−03 | −1.974056E−04 | 5.175247E−04 |
| 72 | −8.628797E+00 | 0.000000E+00 | 1.133255E−02 | 2.658755E−04 | −1.473866E−03 | 4.636468E−04 |
| 81 | −2.692692E−01 | 0.000000E+00 | −1.958643E−02 | 2.014881E−03 | −5.200698E−05 | −3.908397E−05 |
| 82 | −6.500060E+00 | 0.000000E+00 | −2.214839E−02 | 5.134829E−03 | −9.104733E−04 | 1.106878E−04 |

| No. | $a_{12}$ | $a_{14}$ | $a_{16}$ | $a_{18}$ | $a_{20}$ |
|---|---|---|---|---|---|
| 11 | −7.310219E−04 | 2.074877E−04 | −2.690133E−05 |  |  |
| 12 | −4.527802E−03 | 1.308886E−03 | −1.651173E−04 |  |  |
| 21 | −2.609884E−03 | 7.018886E−04 | −8.632875E−05 |  |  |
| 22 | −2.592118E−03 | 8.388257E−04 | −1.101596E−04 |  |  |
| 31 | 6.373532E−03 | −1.897541E−03 | 2.247595E−04 |  |  |
| 32 | 7.153849E−03 | −1.716958E−03 | 1.711532E−04 |  |  |
| 41 | 4.999353E−03 | −1.043416E−03 | 9.926848E−05 |  |  |
| 42 | 3.525317E−03 | −5.649536E−04 | 3.698266E−05 |  |  |
| 51 | 2.951942E−03 | −2.775406E−04 | 2.747633E−06 |  |  |
| 52 | 4.468867E−03 | −9.803868E−04 | 1.516095E−04 | −1.497320E−05 | 7.075345E−07 |
| 61 | 9.999919E−04 | −1.580159E−04 | 1.603654E−05 | −9.318157E−07 | 2.365023E−08 |
| 62 | 3.197132E−03 | −3.247932E−05 | 1.917816E−06 | −6.109033E−08 | 8.454990E−10 |
| 71 | −2.019087E−04 | 3.960471E−05 | −4.268956E−06 | 2.409738E−07 | −5.577662E−09 |
| 72 | −9.054889E−05 | 1.165594E−05 | −9.242590E−07 | 4.020924E−08 | −7.258990E−10 |
| 81 | 9.660809E−06 | −9.943956E−07 | 5.238154E−08 | −1.396350E−09 | 1.496000E−11 |
| 82 | −8.962925E−06 | 4.716622E−07 | −1.546984E−08 | 2.868590E−10 | −2.294000E−12 |

Eighth Embodiment

Figure 20:
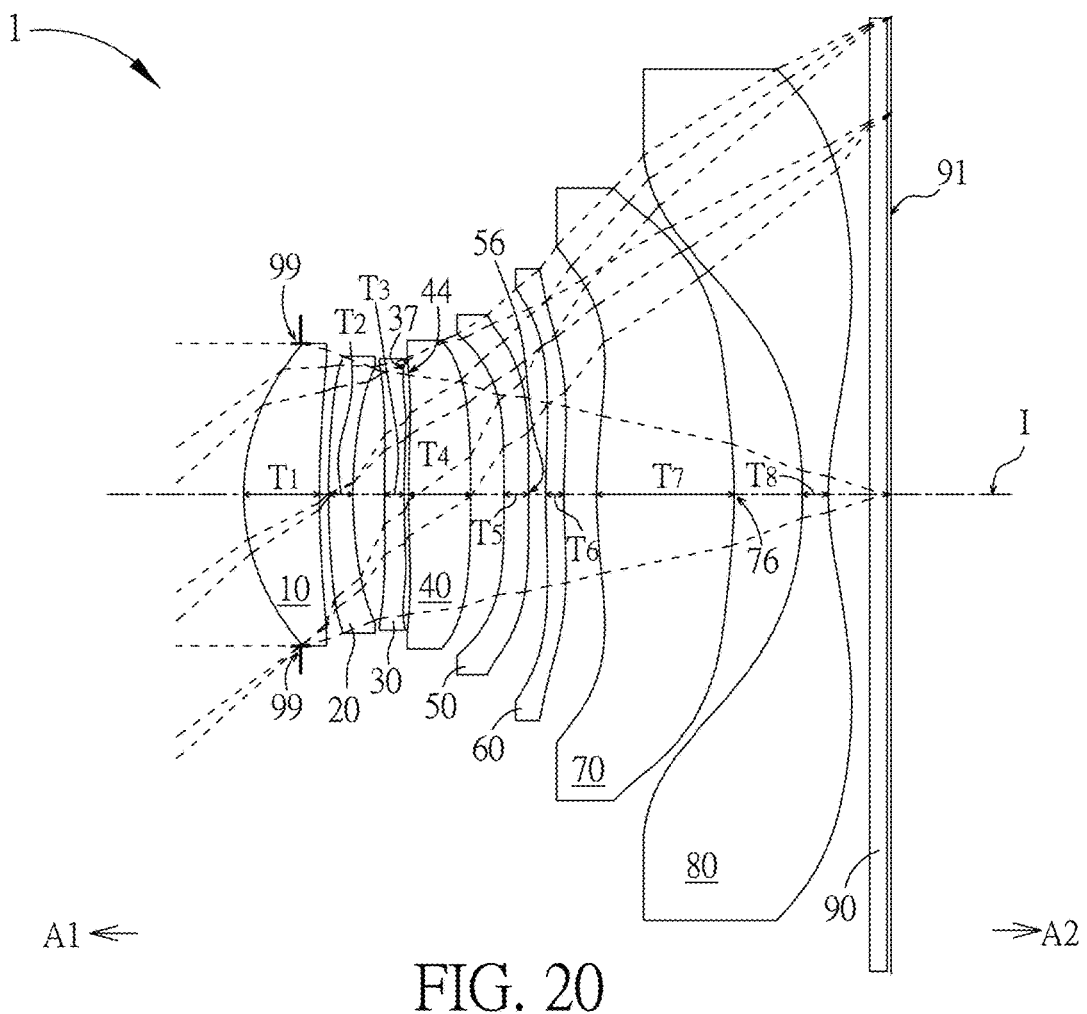
FIG. 20 illustrates an eighth embodiment of the optical imaging lens of the present invention.
Figure 21A:
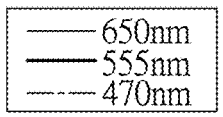
FIG. 21A illustrates the longitudinal spherical aberration on the image plane of the eighth embodiment.
Figure 21A:
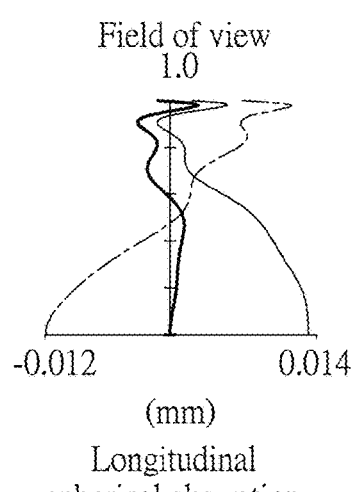
Figure 21B:
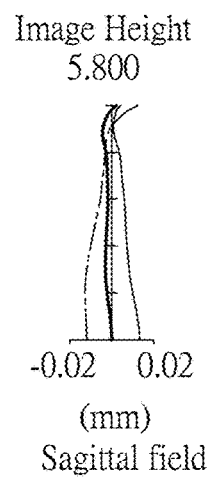
FIG. 21B illustrates the field curvature aberration on the sagittal direction of the eighth embodiment.
Figure 21C:
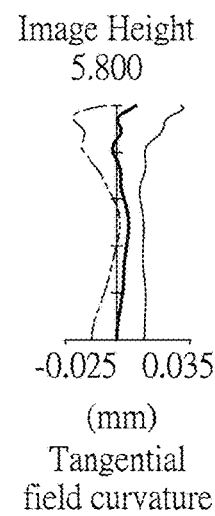
FIG. 21C illustrates the field curvature aberration on the tangential direction of the eighth embodiment.
Figure 21D:
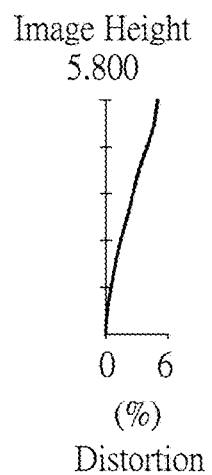
FIG. 21D illustrates the distortion of the eighth embodiment.

Please refer to FIG. 20 which illustrates the eighth embodiment of the optical imaging lens 1 of the present invention. Please refer to FIG. 21A for the longitudinal spherical aberration on the image plane 91 of the eighth embodiment; please refer to FIG. 21B for the field curvature aberration on the sagittal direction; please refer to FIG. 21C for the field curvature aberration on the tangential direction, and please refer to FIG. 21D for the distortion aberration. The components in this embodiment are similar to those in the first embodiment, but the optical data such as the curvature radius, the lens thickness, the aspheric surface or the back focal length in this embodiment are different from the optical data in the first embodiment. Besides, in this embodiment, the periphery region 37 of the image-side surface 32 of the third lens element 30 is concave, the periphery region 44 of the object-side surface 41 of the fourth lens element 40 is concave, the fifth lens element 50 has negative refracting power, the optical axis region 56 of the image-side surface 52 of the fifth lens element 50 is concave, the optical axis region 76 of the image-side surface 72 of the seventh lens element 70 is convex.

The optical data of the eighth embodiment of the optical imaging lens are shown in TABLE 15 while the aspheric surface data are shown in TABLE 16. In this embodiment, EFL=6.048 mm; HFOV=42.403 degrees; TTL=7.839 mm; Fno=1.650; ImgH=5.800 mm. In particular: 1. The system length of the optical imaging lens TTL in this embodiment is shorter than the system length of the optical imaging lens TTL in the first embodiment; 2. The HFOV in this embodiment is larger than the HFOV in the first embodiment; 3. The longitudinal spherical aberration in this embodiment is smaller than the longitudinal spherical aberration in the first embodiment; 4. The field curvature aberration on the sagittal direction in this embodiment is smaller than the field curvature aberration on the sagittal direction in the first embodiment; 5. The field curvature aberration on the tangential direction in this embodiment is smaller than the field curvature aberration on the tangential direction in the first embodiment; 6. The distortion aberration in this embodiment is smaller than the distortion aberration in the first embodiment.

TABLE 15

Eighth embodiment
EFL = 6.048 mm; HFOV = 42.403 degrees; TTL = 7.839 mm; Fno = 1.650; ImgH = 5.800 mm

| No. | | Radius of Curvature (mm) | Ape. Stop Distance Lens Thickness Air Gap (mm) | | Material | Refractive Index | Abbe No. | Focal Length (mm) |
|---|---|---|---|---|---|---|---|---|
| | Object | Infinity | Infinity | | | | | |
| 99 | Ape. Stop | Infinity | −0.690 | | | | | |
| 11 | First Lens | 2.692 | 0.915 | T1 | Plastic | 1.545 | 55.987 | 6.188 |
| 12 | | 11.630 | 0.109 | G12 | | | | |
| 21 | Second Lens | 9.321 | 0.298 | T2 | Plastic | 1.671 | 19.243 | −20.093 |
| 22 | | 5.462 | 0.381 | G23 | | | | |
| 31 | Third Lens | 40.241 | 0.239 | T3 | Plastic | 1.671 | 19.243 | −43.996 |
| 32 | | 17.083 | 0.061 | G34 | | | | |
| 41 | Fourth Lens | 15.612 | 0.747 | T4 | Plastic | 1.545 | 55.987 | 17.896 |
| 42 | | −25.711 | 0.403 | G45 | | | | |
| 51 | Fifth Lens | −148.428 | 0.296 | T5 | Plastic | 1.671 | 19.243 | −101.927 |
| 52 | | 129.254 | 0.208 | G56 | | | | |
| 61 | Sixth Lens | 11.353 | 0.219 | T6 | Plastic | 1.535 | 55.690 | −50.422 |
| 62 | | 7.943 | 0.398 | G67 | | | | |
| 71 | Seventh Lens | 6.703 | 1.667 | T7 | Plastic | 1.545 | 55.987 | 6.320 |
| 72 | | −6.495 | 0.826 | G78 | | | | |
| 81 | Eighth Lens | −5.969 | 0.313 | T8 | Plastic | 1.535 | 55.690 | −3.959 |
| 82 | | 3.359 | 0.500 | G8F | | | | |
| 90 | Filter | Infinity | 0.210 | TF | | 1.517 | 64.167 | |
| | | Infinity | 0.049 | GFP | | | | |
| 91 | Image Plane | Infinity | | | | | | |

TABLE 16

| No. | K | $a_2$ | $a_4$ | $a_6$ | $a_8$ | $a_{10}$ |
|---|---|---|---|---|---|---|
| 11 | 1.059704E−02 | 0.000000E+00 | 4.468994E−04 | 1.337744E−03 | −1.850096E−03 | 1.454746E−03 |
| 12 | 0.000000E+00 | 0.000000E+00 | −9.612539E−03 | 4.045123E−03 | −7.415785E−04 | −4.304803E−05 |
| 21 | 0.000000E+00 | 0.000000E+00 | −1.391166E−02 | 7.208531E−03 | 8.289833E−04 | −1.639488E−03 |
| 22 | 7.585987E+00 | 0.000000E+00 | −1.079771E−02 | 5.086625E−03 | −2.135284E−03 | 1.849286E−03 |
| 31 | 0.000000E+00 | 0.000000E+00 | −1.214068E−02 | −3.297934E−03 | 1.601755E−05 | 8.790820E−04 |
| 32 | 0.000000E+00 | 0.000000E+00 | −1.351019E−02 | −2.010262E−03 | −3.092079E−03 | 3.263847E−03 |
| 41 | 0.000000E+00 | 0.000000E+00 | −1.292911E−02 | 6.893875E−04 | −4.994466E−03 | 3.266409E−03 |
| 42 | 0.000000E+00 | 0.000000E+00 | −1.660674E−02 | 1.058413E−03 | −2.006203E−03 | 6.617688E−04 |
| 51 | 0.000000E+00 | 0.000000E+00 | −2.985110E−02 | −7.779524E−03 | 7.762180E−03 | −6.571713E−03 |
| 52 | 0.000000E+00 | 0.000000E+00 | −1.676151E−02 | −1.601417E−02 | 1.679537E−02 | −1.142292E−02 |
| 61 | 0.000000E+00 | 0.000000E+00 | −2.082402E−02 | −1.613091E−02 | 2.367559E−02 | −1.436051E−02 |
| 62 | 0.000000E+00 | 0.000000E+00 | −4.086345E−02 | −3.410144E−03 | 1.047894E−02 | −5.418411E−03 |
| 71 | 0.000000E+00 | 0.000000E+00 | −1.279326E−02 | −1.392265E−03 | 2.896513E−04 | 3.713449E−05 |

TABLE 16-continued

| No. | | | | | |
|---|---|---|---|---|---|
| 72 | −1.034761E+01 | 0.000000E+00 | 1.439937E−02 | −3.452901E−03 | 2.132328E−04 | −1.640740E−06 |
| 81 | −5.218091E−01 | 0.000000E+00 | −2.894802E−02 | 8.381378E−03 | −2.006777E−03 | 3.088158E−04 |
| 82 | −7.980483E+00 | 0.000000E+00 | −2.125359E−02 | 5.193822E−03 | −8.979767E−04 | 1.016451E−04 |

| No. | $a_{12}$ | $a_{14}$ | $a_{16}$ | $a_{18}$ | $a_{20}$ |
|---|---|---|---|---|---|
| 11 | −6.469937E−04 | 1.469106E−04 | −1.450482E−05 | | |
| 12 | −1.615460E−05 | 2.197201E−05 | −4.449398E−06 | | |
| 21 | 7.223885E−04 | −1.292080E−04 | 8.704947E−06 | | |
| 22 | −1.243664E−03 | 4.384672E−04 | −5.999373E−05 | | |
| 31 | −3.682362E−04 | 6.989211E−05 | −2.892369E−06 | | |
| 32 | −6.015675E−04 | −1.225265E−04 | 4.441260E−05 | | |
| 41 | −4.094713E−04 | −1.834104E−04 | 4.396779E−05 | | |
| 42 | −5.697837E−05 | −1.361601E−05 | 8.249530E−07 | | |
| 51 | 3.008121E−03 | −6.681906E−04 | 5.714384E−05 | | |
| 52 | 4.625208E−03 | −1.064220E−03 | 1.283662E−04 | −6.304522E−06 | 1.480900E−08 |
| 61 | 4.926929E−03 | −1.029367E−03 | 1.301153E−04 | −9.169131E−06 | 2.773006E−07 |
| 62 | 1.450396E−03 | −2.222475E−04 | 1.958841E−05 | −9.229286E−07 | 1.792820E−08 |
| 71 | −4.759250E−05 | 1.431059E−05 | −2.090998E−06 | 1.516310E−07 | −4.334465E−09 |
| 72 | −1.043310E−06 | 2.305175E−07 | −2.598836E−08 | 1.318936E−09 | −2.340800E−11 |
| 81 | −2.864422E−05 | 1.638777E−06 | −5.730988E−08 | 1.132522E−09 | −9.754000E−12 |
| 82 | −7.463873E−06 | 3.524005E−07 | −1.033534E−08 | 1.713640E−10 | −1.227000E−12 |

Ninth Embodiment

Figure 22:
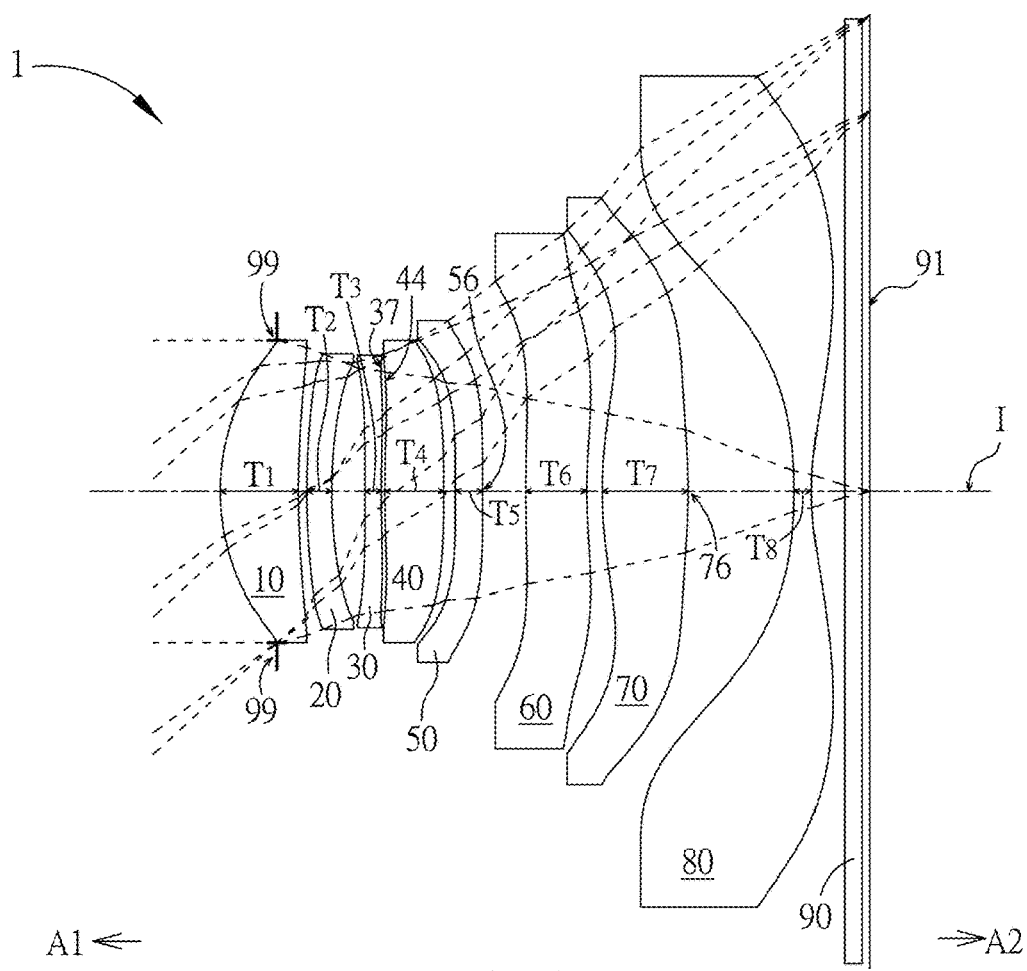
FIG. 22 illustrates a ninth embodiment of the optical imaging lens of the present invention.
Figure 23A:
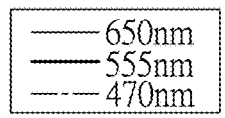
FIG. 23A illustrates the longitudinal spherical aberration on the image plane of the ninth embodiment.
Figure 23A:
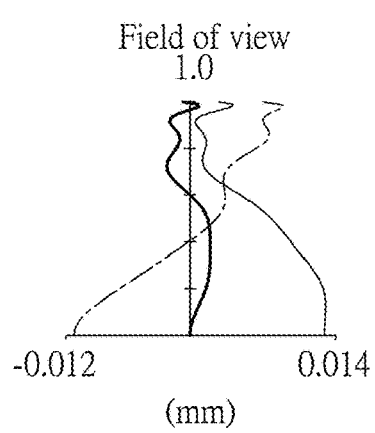
Figure 23B:
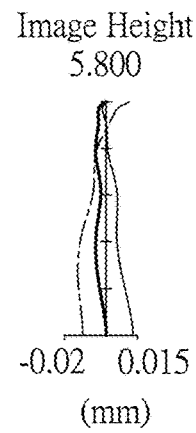
FIG. 23B illustrates the field curvature aberration on the sagittal direction of the ninth embodiment.
Figure 23C:
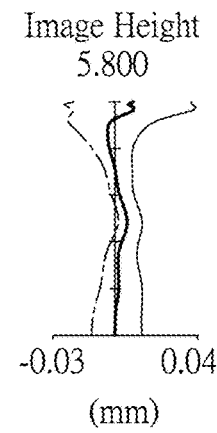
FIG. 23C illustrates the field curvature aberration on the tangential direction of the ninth embodiment.
Figure 23D:
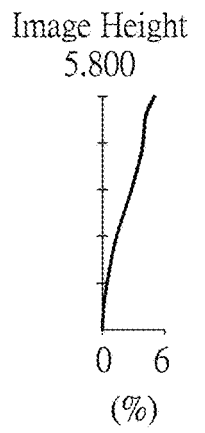
FIG. 23D illustrates the distortion of the ninth embodiment.

Please refer to FIG. 22 which illustrates the ninth embodiment of the optical imaging lens 1 of the present invention. Please refer to FIG. 23A for the longitudinal spherical aberration on the image plane 91 of the ninth embodiment; please refer to FIG. 23B for the field curvature aberration on the sagittal direction; please refer to FIG. 23C for the field curvature aberration on the tangential direction, and please refer to FIG. 23D for the distortion aberration. The components in this embodiment are similar to those in the first embodiment, but the optical data such as the curvature radius, the lens thickness, the aspheric surface or the back focal length in this embodiment are different from the optical data in the first embodiment. Besides, in this embodiment, the periphery region 37 of the image-side surface 32 of the third lens element 30 is concave, the periphery region 44 of the object-side surface 41 of the fourth lens element 40 is concave, the fifth lens element 50 has negative refracting power, the optical axis region 56 of the image-side surface 52 of the fifth lens element 50 is concave, the optical axis region 76 of the image-side surface 72 of the seventh lens element 70 is convex.

The optical data of the ninth embodiment of the optical imaging lens are shown in TABLE 17 while the aspheric surface data are shown in TABLE 18. In this embodiment, EFL=6.079 mm; HFOV=42.261 degrees; TTL=7.905 mm; Fno=1.650; ImgH=5.800 mm. In particular: 1. The system length of the optical imaging lens TTL in this embodiment is shorter than the system length of the optical imaging lens TTL in the first embodiment; 2. The HFOV in this embodiment is larger than the HFOV in the first embodiment; 3. The longitudinal spherical aberration in this embodiment is smaller than the longitudinal spherical aberration in the first embodiment; 4. The field curvature aberration on the sagittal direction in this embodiment is smaller than the field curvature aberration on the sagittal direction in the first embodiment; 5. The field curvature aberration on the tangential direction in this embodiment is smaller than the field curvature aberration on the tangential direction in the first embodiment; 6. The distortion aberration in this embodiment is smaller than the distortion aberration in the first embodiment.

TABLE 17

Ninth Embodiment
EFL = 6.079 mm; HFOV = 42.261 degrees; TTL = 7.905 mm; Fno = 1.650; ImgH = 5.800 mm

| No. | | Radius of Curvature (mm) | Ape. Stop Distance Lens Thickness Air Gap (mm) | | Material | Refractive Index | Abbe No. | Focal Length (mm) |
|---|---|---|---|---|---|---|---|---|
| 99 | Object | Infinity | Infinity | | | | | |
| | Ape. Stop | Infinity | −0.683 | | | | | |
| 11 | First Lens | 2.743 | 0.946 | T1 | Plastic | 1.545 | 55.987 | 6.480 |
| 12 | | 10.708 | 0.103 | G12 | | | | |
| 21 | Second Lens | 8.709 | 0.302 | T2 | Plastic | 1.671 | 19.243 | −24.340 |
| 22 | | 5.619 | 0.406 | G23 | | | | |
| 31 | Third Lens | 974.588 | 0.200 | T3 | Plastic | 1.671 | 19.243 | −28.597 |
| 32 | | 18.997 | 0.044 | G34 | | | | |
| 41 | Fourth Lens | 16.554 | 0.719 | T4 | Plastic | 1.545 | 55.987 | 16.906 |
| 42 | | −20.568 | 0.143 | G45 | | | | |
| 51 | Fifth Lens | −218.444 | 0.331 | T5 | Plastic | 1.671 | 19.243 | −105.890 |
| 52 | | 106.899 | 0.527 | G56 | | | | |
| 61 | Sixth Lens | 16.580 | 0.738 | T6 | Plastic | 1.535 | 55.690 | −25.922 |
| 62 | | 7.446 | 0.187 | G67 | | | | |
| 71 | Seventh Lens | 5.453 | 1.048 | T7 | Plastic | 1.545 | 55.987 | 6.012 |

TABLE 17-continued

Ninth Embodiment
EFL = 6.079 mm; HFOV = 42.261 degrees; TTL = 7.905 mm; Fno = 1.650; ImgH = 5.800 mm

| No. | | Radius of Curvature (mm) | Ape. Stop Distance Lens Thickness Air Gap (mm) | | Material | Refractive Index | Abbe No. | Focal Length (mm) |
|---|---|---|---|---|---|---|---|---|
| 72 | | −7.696 | 1.292 | G78 | | | | |
| 81 | Eighth Lens | −6.038 | 0.211 | T8 | Plastic | 1.535 | 55.690 | −4.359 |
| 82 | | 3.865 | 0.400 | G8F | | | | |
| 90 | Filter | Infinity | 0.210 | TF | | 1.517 | 64.167 | |
| | | Infinity | 0.097 | GFP | | | | |
| 91 | Image Plane | Infinity | | | | | | |

TABLE 18

| No. | K | $a_2$ | $a_4$ | $a_6$ | $a_8$ | $a_{10}$ |
|---|---|---|---|---|---|---|
| 11 | 1.934460E−02 | 0.000000E+00 | 4.272379E−04 | 1.038217E−03 | −1.393245E−03 | 1.057601E−03 |
| 12 | 0.000000E+00 | 0.000000E+00 | −1.001317E−02 | 3.391321E−03 | 4.965363E−04 | −9.901927E−04 |
| 21 | 0.000000E+00 | 0.000000E+00 | −1.348512E−02 | 6.846803E−03 | 1.086379E−03 | −1.755704E−03 |
| 22 | 7.705531E+00 | 0.000000E+00 | −9.873554E−03 | 3.822754E−03 | −1.786895E−04 | −2.977387E−04 |
| 31 | 0.000000E+00 | 0.000000E+00 | −1.234868E−02 | −5.784053E−02 | 6.463723E−03 | −4.763510E−03 |
| 32 | 0.000000E+00 | 0.000000E+00 | −6.757730E−03 | −1.814601E−02 | 1.683489E−02 | −9.975021E−03 |
| 41 | 0.000000E+00 | 0.000000E+00 | −2.197712E−03 | −1.760324E−02 | 1.223587E−02 | −6.543203E−03 |
| 42 | 0.000000E+00 | 0.000000E+00 | −1.920570E−02 | 4.818355E−03 | −7.539734E−03 | 3.456030E−03 |
| 51 | 0.000000E+00 | 0.000000E+00 | −4.001122E−02 | 8.442384E−03 | −6.023607E−03 | 8.579023E−06 |
| 52 | 0.000000E+00 | 0.000000E+00 | −3.344135E−02 | 8.367965E−03 | −5.617221E−03 | 2.268345E−03 |
| 61 | 0.000000E+00 | 0.000000E+00 | −1.881340E−02 | 2.581620E−03 | 1.095730E−03 | −1.305950E−03 |
| 62 | 0.000000E+00 | 0.000000E+00 | −2.265353E−02 | −5.891821E−03 | 5.123589E−03 | −1.778593E−03 |
| 71 | 0.000000E+00 | 0.000000E+00 | −3.251275E−03 | −7.621225E−03 | 2.580824E−03 | −6.144083E−04 |
| 72 | −2.406452E+01 | 0.000000E+00 | 1.485257E−02 | −9.934774E−04 | −1.576703E−03 | 5.250627E−04 |
| 81 | −6.280538E−01 | 0.000000E+00 | −2.642126E−02 | 7.616990E−03 | −1.998105E−03 | 3.278785E−04 |
| 82 | −9.775164E+00 | 0.000000E+00 | −1.586014E−02 | 3.423319E−03 | −5.602309E−04 | 6.088757E−05 |

| No. | $a_{12}$ | $a_{14}$ | $a_{16}$ | $a_{18}$ | $a_{20}$ |
|---|---|---|---|---|---|
| 11 | −4.587698E−04 | 1.013200E−04 | −9.828336E−06 | | |
| 12 | 3.764913E−04 | −6.110251E−05 | 2.663205E−06 | | |
| 21 | 7.569341E−04 | −1.319155E−04 | 8.840784E−06 | | |
| 22 | 2.719886E−05 | 4.100725E−05 | −6.266044E−06 | | |
| 31 | 2.015135E−03 | −4.225557E−04 | 3.671807E−05 | | |
| 32 | 3.980706E−03 | −8.405368E−04 | 7.577689E−05 | | |
| 41 | 2.548754E−03 | −5.418037E−04 | 4.745698E−05 | | |
| 42 | −7.198966E−04 | 7.640751E−05 | −5.923151E−06 | | |
| 51 | 1.305541E−03 | −4.562575E−04 | 4.877213E−05 | | |
| 52 | −7.609040E−04 | 2.865971E−04 | −8.406581E−05 | 1.333205E−05 | −8.104404E−07 |
| 61 | 4.933505E−04 | −1.028168E−04 | 1.281295E−05 | −8.983190E−07 | 2.746139E−08 |
| 62 | 3.586114E−04 | −4.314913E−05 | 3.040534E−06 | −1.156602E−07 | 1.826786E−09 |
| 71 | 9.312976E−05 | −7.254587E−06 | 1.187968E−07 | 1.770960E−08 | −8.007100E−10 |
| 72 | −8.995399E−05 | 9.684821E−06 | −6.541032E−07 | 2.508064E−08 | −4.115980E−10 |
| 81 | −3.157472E−05 | 1.850902E−06 | −6.587639E−08 | 1.319640E−09 | −1.148400E−11 |
| 82 | −4.325425E−06 | 1.985343E−07 | −5.709624E−09 | 9.423400E−11 | −6.840000E−13 |

Tenth Embodiment

Figure 24:
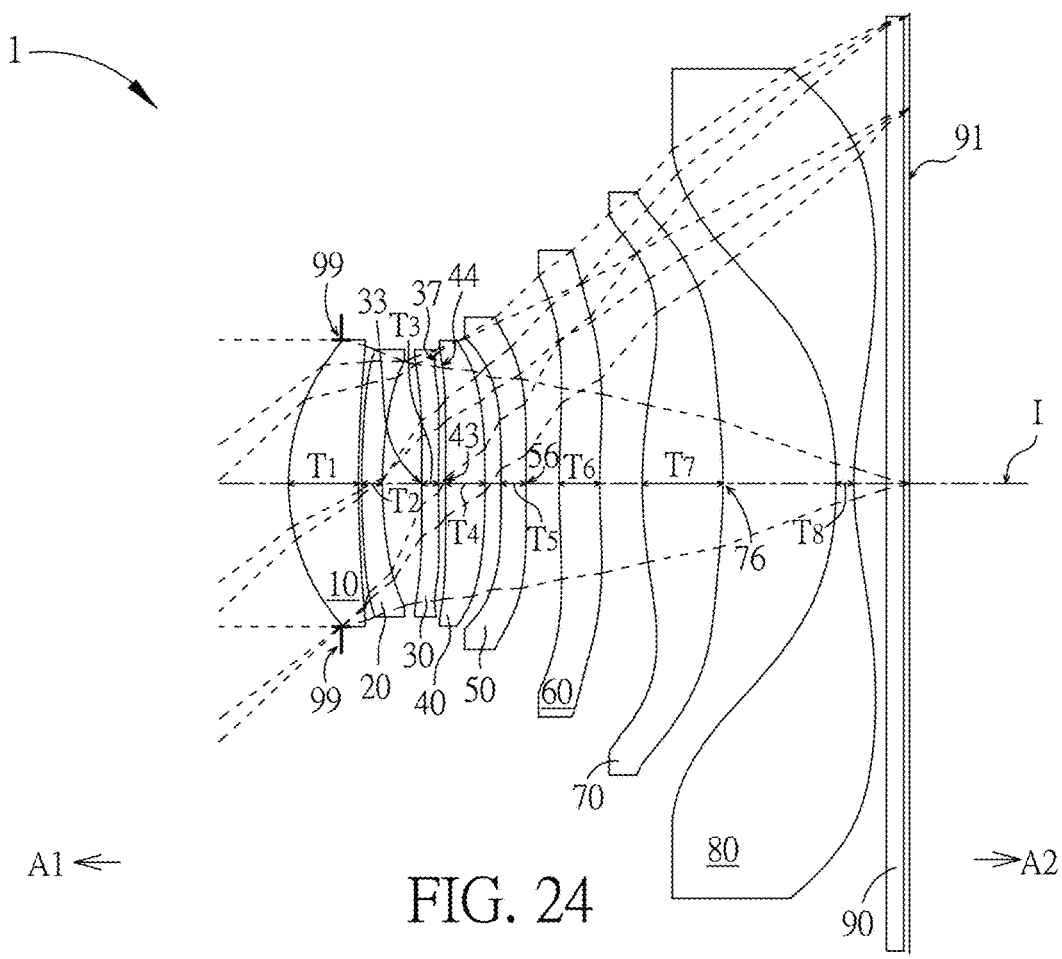
FIG. 24 illustrates a tenth embodiment of the optical imaging lens of the present invention.
Figures 25A, 25B, 25C, 25D:
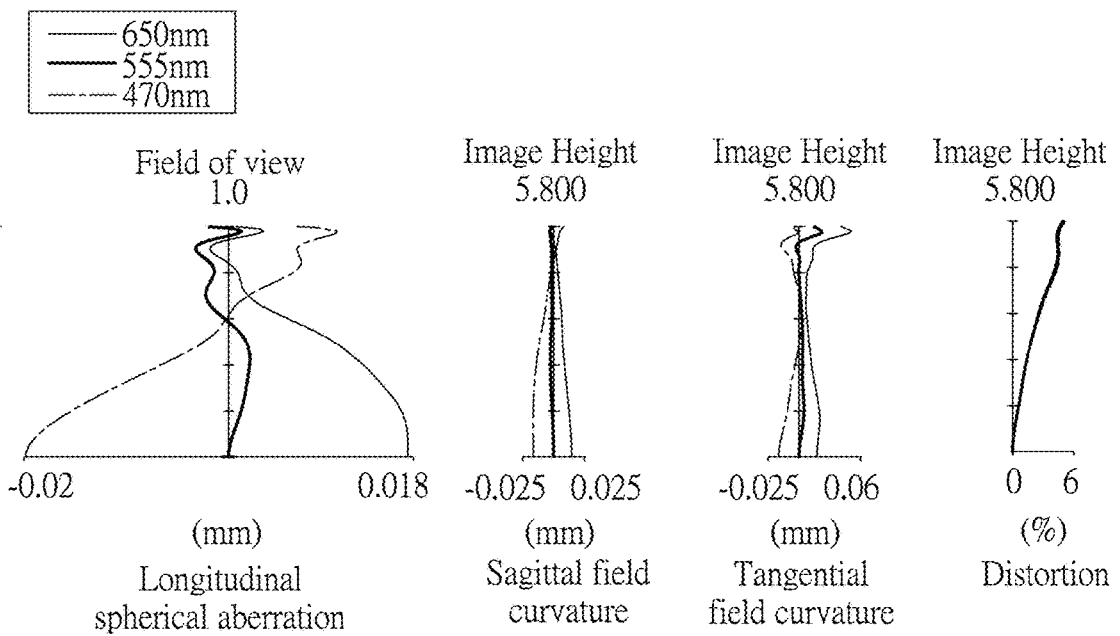
FIG. 25A illustrates the longitudinal spherical aberration on the image plane of the tenth embodiment.
FIG. 25B illustrates the field curvature aberration on the sagittal direction of the tenth embodiment.
FIG. 25C illustrates the field curvature aberration on the tangential direction of the tenth embodiment.
FIG. 25D illustrates the distortion of the tenth embodiment.

Please refer to FIG. 24 which illustrates the tenth embodiment of the optical imaging lens 1 of the present invention. Please refer to FIG. 25A for the longitudinal spherical aberration on the image plane 91 of the tenth embodiment; please refer to FIG. 25B for the field curvature aberration on the sagittal direction; please refer to FIG. 25C for the field curvature aberration on the tangential direction, and please refer to FIG. 25D for the distortion aberration. The components in this embodiment are similar to those in the first embodiment, but the optical data such as the curvature radius, the lens thickness, the aspheric surface or the back focal length in this embodiment are different from the optical data in the first embodiment. Besides, in this embodiment, the optical axis region 33 of the object-side surface 31 of the third lens element 30 is concave, the periphery region 37 of the image-side surface 32 of the third lens element 30 is concave, the optical axis region 43 of the object-side surface 41 of the fourth lens element 40 is concave, the periphery region 44 of the object-side surface 41 of the fourth lens element 40 is concave, the fifth lens element 50 has negative refracting power, the optical axis region 56 of the image-side surface 52 of the fifth lens element 50 is concave, the optical axis region 76 of the image-side surface 72 of the seventh lens element 70 is convex.

The optical data of the tenth embodiment of the optical imaging lens are shown in TABLE 19 while the aspheric surface data are shown in TABLE 20. In this embodiment, EFL=5.837 mm; HFOV=43.422 degrees; TTL=7.654 mm;

Fno=1.650; ImgH=5.800 mm. In particular: 1. The system length of the optical imaging lens TTL in this embodiment is shorter than the system length of the optical imaging lens TTL in the first embodiment; 2. The HFOV in this embodiment is larger than the HFOV in the first embodiment; 3. The longitudinal spherical aberration in this embodiment is smaller than the longitudinal spherical aberration in the first embodiment; 4. The field curvature aberration on the sagittal direction in this embodiment is smaller than the field curvature aberration on the sagittal direction in the first embodiment; 5. The field curvature aberration on the tangential direction in this embodiment is smaller than the field curvature aberration on the tangential direction in the first embodiment; 6. The distortion aberration in this embodiment is smaller than the distortion aberration in the first embodiment.

TABLE 19

Tenth Embodiment
EFL = 5.837 mm; HFOV = 43.422 degrees; TTL = 7.654 mm; Fno = 1.650; ImgH = 5.800 mm

| No. | | Radius of Curvature (mm) | Ape. Stop Distance Lens Thickness Air Gap (mm) | Material | Refractive Index | Abbe No. | Focal Length (mm) |
|---|---|---|---|---|---|---|---|
| | Object | Infinity | Infinity | | | | |
| 99 | Ape. Stop | Infinity | −0.648 | | | | |
| 11 | First Lens | 2.716 | 0.859 | T1 Plastic | 1.545 | 55.987 | 6.083 |
| 12 | | 13.193 | 0.040 | G12 | | | |
| 21 | Second Lens | 10.007 | 0.263 | T2 Plastic | 1.642 | 22.409 | −17.819 |
| 22 | | 5.303 | 0.484 | G23 | | | |
| 31 | Third Lens | −1234.140 | 0.208 | T3 Plastic | 1.608 | 26.904 | −66.434 |
| 32 | | 42.043 | 0.085 | G34 | | | |
| 41 | Fourth Lens | −2465.305 | 0.485 | T4 Plastic | 1.545 | 55.987 | 26.283 |
| 42 | | −14.276 | 0.197 | G45 | | | |
| 51 | Fifth Lens | −359.358 | 0.307 | T5 Plastic | 1.671 | 19.243 | −65.961 |
| 52 | | 51.057 | 0.408 | G56 | | | |
| 61 | Sixth Lens | 10.331 | 0.498 | T6 Plastic | 1.535 | 55.690 | −98.969 |
| 62 | | 8.503 | 0.524 | G67 | | | |
| 71 | Seventh Lens | 5.956 | 1.000 | T7 Plastic | 1.545 | 55.987 | 6.097 |
| 72 | | −7.109 | 1.391 | G78 | | | |
| 81 | Eighth Lens | −5.528 | 0.220 | T8 Plastic | 1.535 | 55.690 | −4.182 |
| 82 | | 3.829 | 0.400 | G8F | | | |
| 90 | Filter | Infinity | 0.210 | TF | 1.517 | 64.167 | |
| | | Infinity | 0.075 | GFP | | | |
| 91 | Image Plane | Infinity | | | | | |

TABLE 20

| No. | K | $a_2$ | $a_4$ | $a_6$ | $a_8$ | $a_{10}$ |
|---|---|---|---|---|---|---|
| 11 | 6.841432E−02 | 0.000000E+00 | 8.522277E−04 | 1.961493E−03 | −2.684054E−03 | 2.305229E−03 |
| 12 | 0.000000E+00 | 0.000000E+00 | −1.420424E−02 | 8.535962E−03 | −4.821291E−04 | −1.848910E−03 |
| 21 | 0.000000E+00 | 0.000000E+00 | −1.683668E−02 | 1.019243E−02 | 1.271137E−03 | −3.441424E−03 |
| 22 | 7.780787E+00 | 0.000000E+00 | −8.812620E−03 | 3.780809E−03 | −1.765880E−03 | 1.785417E−03 |
| 31 | 0.000000E+00 | 0.000000E+00 | −1.131098E−02 | −1.256422E−02 | 1.019826E−02 | −5.767134E−03 |
| 32 | 0.000000E+00 | 0.000000E+00 | 1.145551E−03 | −1.881410E−02 | 8.152581E−03 | −2.696054E−03 |
| 41 | 0.000000E+00 | 0.000000E+00 | 5.812749E−03 | −1.031021E−02 | −3.536329E−04 | 4.533792E−04 |
| 42 | 0.000000E+00 | 0.000000E+00 | −2.025966E−02 | 2.819952E−03 | −7.471166E−03 | 5.448814E−03 |
| 51 | 0.000000E+00 | 0.000000E+00 | −3.757430E−02 | 3.703072E−03 | −1.235143E−02 | 9.120973E−03 |
| 52 | 0.000000E+00 | 0.000000E+00 | −2.744896E−02 | 6.388469E−03 | −1.063724E−02 | 6.866729E−03 |
| 61 | 0.000000E+00 | 0.000000E+00 | −3.430776E−02 | 1.800835E−02 | −8.952520E−03 | 3.015002E−03 |
| 62 | 0.000000E+00 | 0.000000E+00 | −4.513396E−02 | 1.516673E−02 | −5.673047E−03 | 1.811150E−03 |
| 71 | 0.000000E+00 | 0.000000E+00 | −7.937064E−03 | 2.563908E−04 | −5.118088E−04 | 1.116283E−04 |
| 72 | −1.776427E+01 | 0.000000E+00 | 1.078602E−02 | −1.042288E−03 | −4.970058E−04 | 7.898646E−05 |
| 81 | −5.811491E−01 | 0.000000E+00 | −3.753298E−02 | 1.379015E−02 | −3.786891E−03 | 6.480801E−04 |
| 82 | −8.079073E+00 | 0.000000E+00 | −2.212507E−02 | 6.061165E−03 | −1.123465E−03 | 1.337683E−04 |

| No. | $a_{12}$ | $a_{14}$ | $a_{16}$ | $a_{18}$ | $a_{20}$ |
|---|---|---|---|---|---|
| 11 | −1.092953E−03 | 2.677012E−04 | −2.815738E−05 | | |
| 12 | 9.871863E−04 | −2.114051E−04 | 1.487701E−05 | | |
| 21 | 1.801942E−03 | −3.991532E−04 | 3.332004E−05 | | |
| 22 | −1.160970E−03 | 4.294035E−04 | −5.931133E−05 | | |
| 31 | 2.780244E−03 | −7.407002E−04 | 7.713188E−05 | | |
| 32 | 1.868565E−03 | −6.772538E−04 | 8.482581E−05 | | |
| 41 | 9.718220E−04 | −5.215905E−04 | 7.608032E−05 | | |
| 42 | −1.997272E−03 | 3.855108E−04 | −3.377829E−05 | | |
| 51 | −3.021973E−03 | 4.812754E−04 | −3.108844E−05 | | |
| 52 | −2.158980E−03 | 2.920275E−04 | 1.208788E−05 | −8.489490E−06 | 7.736166E−07 |
| 61 | −7.070256E−04 | 1.108939E−04 | −1.053126E−05 | 5.095769E−07 | −8.134655E−09 |

TABLE 20-continued

| | | | | |
|---|---|---|---|---|
| 62 −4.365279E−04 | 7.339584E−05 | −7.765308E−06 | 4.539332E−07 | −1.110897E−08 |
| 71 −1.788390E−05 | 3.372372E−06 | −4.584141E−07 | 3.150791E−08 | −8.228750E−10 |
| 72 −2.102745E−06 | −4.935155E−08 | −3.764379E−08 | 4.361393E−09 | −1.267810E−10 |
| 81 −6.733012E−05 | 4.326610E−06 | −1.692038E−07 | 3.705643E−09 | −3.496200E−11 |
| 82 −1.026097E−05 | 5.044674E−07 | −1.539572E−08 | 2.657840E−10 | −1.982000E−12 |

Some important ratios in each embodiment are shown in TABLE 21 and TABLE 22.

TABLE 21

| Embodiment | 1 | 2 | 3 | 4 | 5 | 6 | 7 | 8 | 9 | 10 |
|---|---|---|---|---|---|---|---|---|---|---|
| T1 | 1.622 | 1.303 | 0.773 | 0.876 | 0.799 | 0.861 | 0.781 | 0.915 | 0.946 | 0.859 |
| G12 | 0.292 | 0.117 | 0.073 | 0.044 | 0.140 | 0.049 | 0.051 | 0.109 | 0.103 | 0.040 |
| T2 | 0.330 | 0.351 | 0.242 | 0.152 | 0.273 | 0.384 | 0.280 | 0.298 | 0.302 | 0.263 |
| G23 | 0.447 | 0.358 | 0.394 | 0.410 | 0.487 | 0.562 | 0.471 | 0.381 | 0.406 | 0.484 |
| T3 | 0.239 | 0.393 | 0.211 | 0.181 | 0.347 | 0.309 | 0.280 | 0.239 | 0.200 | 0.208 |
| G34 | 0.052 | 0.072 | 0.053 | 0.051 | 0.044 | 0.184 | 0.148 | 0.061 | 0.044 | 0.085 |
| T4 | 0.798 | 0.802 | 0.507 | 1.055 | 0.596 | 0.531 | 0.568 | 0.747 | 0.719 | 0.485 |
| G45 | 0.269 | 0.225 | 0.690 | 0.579 | 0.658 | 0.256 | 0.280 | 0.403 | 0.143 | 0.197 |
| T5 | 0.945 | 0.755 | 0.255 | 0.992 | 0.731 | 0.275 | 0.291 | 0.296 | 0.331 | 0.307 |
| G56 | 0.093 | 0.201 | 0.020 | 0.020 | 0.023 | 0.477 | 0.437 | 0.208 | 0.527 | 0.408 |
| T6 | 0.574 | 0.648 | 0.471 | 0.590 | 0.496 | 0.281 | 0.424 | 0.219 | 0.738 | 0.498 |
| G67 | 0.278 | 0.366 | 0.336 | 0.310 | 0.338 | 0.177 | 0.369 | 0.398 | 0.187 | 0.524 |
| T7 | 0.540 | 0.476 | 0.450 | 0.483 | 0.547 | 1.132 | 1.175 | 1.667 | 1.048 | 1.000 |
| G78 | 0.963 | 1.172 | 0.897 | 0.867 | 0.825 | 0.765 | 0.761 | 0.826 | 1.292 | 1.391 |
| T8 | 0.265 | 0.100 | 0.210 | 0.253 | 0.382 | 0.587 | 0.385 | 0.313 | 0.211 | 0.220 |
| G8F | 0.445 | 0.445 | 0.445 | 0.345 | 0.345 | 0.600 | 0.600 | 0.500 | 0.400 | 0.400 |
| TF | 0.308 | 0.308 | 0.308 | 0.308 | 0.308 | 0.210 | 0.210 | 0.210 | 0.210 | 0.210 |
| GFP | 0.387 | 0.141 | 1.969 | 0.122 | 0.178 | 0.159 | 0.284 | 0.049 | 0.097 | 0.075 |
| BFL | 1.141 | 0.895 | 2.723 | 0.775 | 0.832 | 0.969 | 1.094 | 0.759 | 0.707 | 0.685 |
| EFL | 6.171 | 5.962 | 8.044 | 5.251 | 4.929 | 6.230 | 6.104 | 6.048 | 6.079 | 5.837 |
| TL | 7.707 | 7.338 | 5.581 | 6.861 | 6.688 | 6.829 | 6.704 | 7.081 | 7.198 | 6.969 |
| TTL | 8.848 | 8.233 | 8.304 | 7.637 | 7.519 | 7.798 | 7.798 | 7.839 | 7.905 | 7.654 |
| ALT | 5.312 | 4.828 | 3.119 | 4.582 | 4.173 | 4.358 | 4.187 | 4.694 | 4.496 | 3.840 |
| AAG | 2.394 | 2.510 | 2.462 | 2.279 | 2.515 | 2.471 | 2.517 | 2.387 | 2.702 | 3.128 |
| Tmax | 1.622 | 1.303 | 0.773 | 1.055 | 0.799 | 1.132 | 1.175 | 1.667 | 1.048 | 1.000 |
| Tmin | 0.239 | 0.100 | 0.210 | 0.152 | 0.273 | 0.275 | 0.280 | 0.219 | 0.200 | 0.208 |
| Gmax | 0.963 | 1.172 | 0.897 | 0.867 | 0.825 | 0.765 | 0.761 | 0.826 | 1.292 | 1.391 |
| V1 | 55.987 | 55.987 | 55.987 | 55.987 | 55.987 | 55.987 | 55.987 | 55.987 | 55.987 | 55.987 |
| V2 | 19.480 | 25.920 | 19.480 | 19.480 | 19.480 | 19.243 | 19.243 | 19.243 | 19.243 | 22.409 |
| V3 | 19.480 | 21.514 | 19.480 | 19.480 | 19.480 | 19.243 | 23.972 | 19.243 | 19.243 | 26.904 |
| V4 | 55.987 | 55.987 | 55.987 | 55.987 | 55.987 | 55.987 | 55.987 | 55.987 | 55.987 | 55.987 |
| V5 | 55.987 | 55.987 | 55.987 | 55.987 | 55.987 | 19.243 | 19.243 | 19.243 | 19.243 | 19.243 |
| V6 | 20.373 | 20.373 | 20.373 | 20.373 | 20.373 | 55.690 | 55.690 | 55.690 | 55.690 | 55.690 |
| V7 | 55.987 | 55.987 | 55.987 | 55.987 | 55.987 | 55.987 | 55.987 | 55.987 | 55.987 | 55.987 |
| V8 | 55.987 | 55.987 | 55.987 | 55.987 | 55.987 | 55.690 | 55.690 | 55.690 | 55.690 | 55.690 |
| HFOV | 37.773 | 41.952 | 35.977 | 41.282 | 41.495 | 41.562 | 42.143 | 42.403 | 42.261 | 43.422 |
| Fno | 1.600 | 1.600 | 2.129 | 1.600 | 1.600 | 1.999 | 1.999 | 1.650 | 1.650 | 1.650 |
| ImgH | 6.700 | 6.700 | 6.700 | 6.700 | 6.700 | 5.800 | 5.800 | 5.800 | 5.800 | 5.800 |

TABLE 22

| Embodiment | 1 | 2 | 3 | 4 | 5 | 6 | 7 | 8 | 9 | 10 |
|---|---|---|---|---|---|---|---|---|---|---|
| D12/(G45 + G67) | 4.100 | 3.000 | 1.060 | 1.207 | 1.218 | 2.985 | 1.710 | 1.651 | 4.099 | 1.613 |
| |V2 − V3| | 0.000 | 4.407 | 0.000 | 0.000 | 0.000 | 0.000 | 4.729 | 0.000 | 0.000 | 4.495 |
| (G45 + T7)/(G34 + T8) | 2.547 | 4.064 | 4.338 | 3.492 | 2.829 | 1.801 | 2.734 | 5.535 | 4.666 | 3.924 |
| (G78 + T8)/(G12 + G67) | 2.155 | 2.635 | 2.710 | 3.166 | 2.526 | 5.999 | 2.726 | 2.248 | 5.185 | 2.856 |
| (TL + EFL)/Fno | 8.674 | 8.313 | 6.400 | 7.570 | 7.260 | 6.533 | 6.407 | 7.957 | 8.047 | 7.761 |
| AAG/T8 | 9.025 | 25.045 | 11.709 | 8.999 | 6.577 | 4.212 | 6.545 | 7.636 | 12.777 | 14.219 |
| ALT/(G23 + T3) | 7.750 | 6.431 | 5.156 | 7.755 | 5.000 | 5.004 | 5.578 | 7.567 | 7.413 | 5.554 |
| Gmax/Tmin | 4.036 | 11.697 | 4.266 | 5.716 | 3.017 | 2.788 | 2.721 | 3.766 | 6.459 | 6.696 |
| (T1 + T4)/(T5 + G56) | 2.332 | 2.204 | 4.657 | 1.909 | 1.850 | 1.851 | 1.851 | 3.296 | 1.939 | 1.879 |
| TL/(G12 + T3 + G34) | 13.226 | 12.600 | 16.587 | 24.848 | 12.601 | 12.602 | 14.031 | 17.296 | 20.772 | 20.942 |
| TTL/Fno | 5.530 | 5.146 | 3.901 | 4.773 | 4.700 | 3.901 | 3.901 | 4.751 | 4.791 | 4.639 |
| AAG/Tmin | 10.035 | 25.045 | 11.709 | 15.035 | 9.199 | 9.001 | 9.005 | 10.879 | 13.510 | 15.061 |
| ALT/(Tmin + Gmax) | 4.421 | 3.794 | 2.817 | 4.500 | 3.799 | 4.191 | 4.026 | 4.490 | 3.014 | 2.403 |
| (T1 + G34 + T8)/BFL | 1.700 | 1.650 | 0.380 | 1.523 | 1.474 | 1.685 | 1.200 | 1.699 | 1.699 | 1.699 |
| G68/T2 | 5.401 | 5.730 | 6.962 | 10.948 | 6.252 | 5.406 | 8.245 | 9.716 | 8.357 | 11.066 |
| (EFL + BFL)/Fno | 4.570 | 4.286 | 5.058 | 3.766 | 3.600 | 3.601 | 3.601 | 4.125 | 4.113 | 3.953 |
| ImgH/Fno | 4.188 | 4.188 | 3.147 | 4.188 | 4.188 | 2.901 | 2.901 | 3.515 | 3.515 | 3.515 |

TABLE 22-continued

| Embodiment | 1 | 2 | 3 | 4 | 5 | 6 | 7 | 8 | 9 | 10 |
|---|---|---|---|---|---|---|---|---|---|---|
| AAG/(T5 + G56 + T6) | 1.486 | 1.566 | 3.300 | 1.424 | 2.011 | 2.393 | 2.176 | 3.297 | 1.692 | 2.579 |
| TTL/(Tmin + Gmax) | 7.363 | 6.470 | 7.500 | 7.500 | 6.846 | 7.499 | 7.498 | 7.498 | 5.299 | 4.788 |
| (T2 + T4)/(T6 + G67) | 1.324 | 1.138 | 0.927 | 1.342 | 1.042 | 1.999 | 1.063 | 1.694 | 1.104 | 0.733 |
| |V5 − V6| | 35.614 | 35.614 | 35.614 | 35.614 | 35.614 | 36.447 | 36.447 | 36.447 | 36.447 | 36.447 |
| V3 + V4 + V8 | 131.454 | 133.488 | 131.454 | 131.454 | 131.454 | 130.920 | 135.649 | 130.920 | 130.920 | 138.581 |
| V1 + V4 + V7 | 167.961 | 167.961 | 167.961 | 167.961 | 167.961 | 167.961 | 167.961 | 167.961 | 167.961 | 167.961 |
| V4 − V3 | 36.507 | 34.473 | 36.507 | 36.507 | 36.507 | 36.744 | 32.015 | 36.744 | 36.744 | 29.083 |

Each embodiment of the present invention provides an optical imaging lens which has good imaging quality. For example, the following lens element concave or convex configuration may effectively reduce the field curvature aberration and the distortion aberration to optimize the imaging quality of the optical imaging lens. Furthermore, the present invention has the corresponding advantages:

1. When the following conditions are satisfied: the third lens element 30 has negative refracting power, the periphery region 34 of the object-side surface 31 of the third lens element 30 is concave, the sixth lens element 60 has negative refracting power, the optical axis region 63 of the object-side surface 61 of the sixth lens element 60 is convex, the seventh lens element 70 has positive refracting power, |V2−V3|≤5.000, and the following conditions are further satisfied: the optical axis region 16 of the image-side surface 12 of the first lens element 10 is concave, the periphery region 74 of the object-side surface 71 of the seventh lens element 70 is concave, and D12/(G45+G67)≤4.100, it can effectively improve the chromatic aberration of the optical imaging lens and increase the luminous flux, so that the optical imaging lens has good imaging quality, wherein the preferable ranges of |V2−V3| and D12/(G45+G67) are 0.000≤|V2−V3|≤5.000 and 0.950≤D12/(G45+G67)≤4.100.

2. When the following conditions are satisfied: the third lens element 30 has negative refracting power, the periphery region 34 of the object-side surface 31 of the third lens element 30 is concave, the sixth lens element 60 has negative refracting power, the optical axis region 63 of the object-side surface 61 of the sixth lens element 60 is convex, the seventh lens element 70 has positive refracting power, |V2−V3|≤5.000, and the following conditions are further satisfied: D12/(G45+G67)≤3.000, in addition to improving the chromatic aberration and luminous flux of the optical imaging lens, it can effectively shorten the system length while maintaining good imaging quality.

3. When the following conditions are satisfied: the third lens element 30 has negative refracting power, the periphery region 34 of the object-side surface 31 of the third lens element 30 is concave, the sixth lens element 60 has negative refracting power, |V2−V3|≤5.000, In addition to improving the chromatic aberration of the optical imaging lens and increasing the luminous flux. If the following conditions are further satisfied: the periphery region 44 of the object-side surface 41 of the fourth lens element 40 is concave, and the optical axis region 76 of the image-side surface 72 of the seventh lens element 70 is convex, the imaging rays can be effectively and smoothly focused on the image plane.

4. When the lens material satisfies the following configuration relationships, it is beneficial to the transmission and deflection of imaging rays, and effectively improves the chromatic aberration, so that the optical imaging lens has good imaging quality:

at least two lens elements have Abbe number greater than or equal to 50 from the sixth lens element 60 to the eighth lens element 80, that is, two (or all three) Abbe number of V6, V7 and V8 are greater than or equal to 50; and there are no more than three lens element with Abbe number less than 50 from the first lens element 10 to the fifth lens element 50, that is, only three (or less than three) of V1, V2, V3, V4, and V5 have Abbe number less than 50 at most.

|V5−V6|≥20.000, the preferable range is 20.000≤|V5−V6|≤40.000;

V3+V4+V8≥120.000, the preferable range is 120.000≤V3+V4+V8≤155.000, and the better range is 120.000≤V3+V4+V8≤140.000;

V1+V4+V7≥130.000, the preferable range is 130.000≤V1+V4+V7≤185.000;

V4−V3≥15.000, the preferable range is 15.000≤V4−V3≤40.500.

5. When the image height (ImgH) or the f-number (Fno) satisfies the following relationships, the image height of the optical imaging lens can be increased, and the f-number can be reduced to improve the imaging pixel and resolution. When the better ranges are satisfied, it can improve the aberration and distortion of optical imaging lens, and when the better ranges are satisfied, it can further improve the spherical aberration:

(TL+EFL)/Fno≥6.400 mm, the preferable range is 6.400 mm≤(TL+EFL)/Fno≤9.500 mm, and the better range is 6.400 mm≤(TL+EFL)/Fno≤8.500 mm;

TTL/Fno≥3.900 mm, the preferable range is 3.900 mm≤TTL/Fno≤6.000 mm, and the better range is 3.900 mm≤TTL/Fno≤5.100 mm;

(EFL+BFL)/Fno≥3.600 mm, the preferable range is 3.600 mm≤(EFL+BFL)/Fno≤5.500 mm, and the better range is 3.600 mm≤(EFL+BFL)/Fno≤4.500 mm;

ImgH/Fno≥2.900 mm, the preferable range is 2.900 mm≤ImgH/Fno≤4.600 mm, and the better range is 2.900 mm≤ImgH/Fno≤3.800 mm.

6. In order to shorten the system length of optical imaging lens, the air gap between lens elements or lens thickness can be adjusted appropriately, but the difficulty of manufacturing and the imaging quality must be considered at the same time. Therefore, if the numerical limits of the following conditions are satisfied, the better configuration can be obtained. When the preferable ranges are satisfied, it can improve the aberration and distortion of optical imaging lens, and when the better ranges are satisfied, it can further improve the spherical aberration:

(G45+T7)/(G34+T8)≥1.800, the preferable range is 1.800≤(G45+T7)/(G34+T8)≤6.000, and the better range is 1.800≤(G45+T7)/(G34+T8)≤4.700;

(G78+T8)/(G12+G67)≤6.000, the preferable range is 2.000≤(G78+T8)/(G12+G67)≤6.000; AAG/T8≥4.200, the preferable range is 4.200≤AAG/T8≤27.500, and the better range is 4.200≤AAG/T8≤16.000;

ALT/(G23+T3)≥5.000, the preferable range is 5.000≤ALT/(G23+T3)≤8.500;

Gmax/Tmin≥2.700, the preferable range is 2.700≤Gmax/Tmin≤12.800, and the better range is 2.700≤Gmax/Tmin≤7.500;

(T1+T4)/(T5+G56)≥1.850, the preferable range is 1.850≤(T1+T4)/(T5+G56)≤5.100, and the better range is 1.850≤(T1+T4)/(T5+G56)≤3.600;

TL/(G12+T3+G34)≥12.600, the preferable range is 12.600≤TL/(G12+T3+G34)≤27.300, and the better range is 12.600≤TL/(G12+T3+G34)≤23.000;

AAG/Tmin≥9.000, the preferable range is 9.000≤AAG/Tmin≤27.500, and the better range is 9.000≤AAG/Tmin≤16.500;

ALT/(Tmin+Gmax)≤4.500, the preferable range is 2.100≤ALT/(Tmin+Gmax)≤4.500, and the better range is 2.600≤ALT/(Tmin+Gmax)≤4.500;

(T1+G34+T8)/BFL≤1.700, the preferable range is 0.300≤(T1+G34+T8)/BFL≤1.700, and the better range is 1.100≤(T1+G34+T8)/BFL≤1.700;

G68/T2≥5.400, the preferable range is 5.400≤G68/T2≤12.000;

AAG/(T5+G56+T6)≤3.300, the preferable range is 1.300≤AAG/(T5+G56+T6)≤3.300, and the better range is 1.500≤AAG/(T5+G56+T6)≤3.300;

TTL/(Tmin+Gmax)≤7.500, the preferable range is 4.300≤TTL/(Tmin+Gmax)≤7.500, and the better range is 5.800≤TTL/(Tmin+Gmax)≤7.500;

(T2+T4)/(T6+G67)≤2.000, the preferable range is 0.650≤(T2+T4)/(T6+G67)≤2.000, and the better range is 0.800≤(T2+T4)/(T6+G67)≤2.000.

By observing three representative wavelengths of 470 nm, 555 nm and 650 nm in each embodiment of the present invention, it is suggested off-axis light of different heights of every wavelength all concentrates on the image plane, and deviations of every curve also reveal that off-axis light of different heights are well controlled so the embodiments do improve the spherical aberration, the astigmatic aberration and the distortion aberration. In addition, by observing the imaging quality data the distances amongst the three representing different wavelengths of 470 nm, 555 nm and 650 nm are pretty close to one another, which means the embodiments of the present invention are able to concentrate light of the three representing different wavelengths so that the aberration is greatly improved. Given the above, it is understood that the embodiments of the present invention provides outstanding imaging quality.

In addition, any arbitrary combination of the parameters of the embodiments can be selected to increase the lens limitation so as to facilitate the design of the same structure of the present invention.

In the light of the unpredictability of the optical imaging lens, the present invention suggests the above principles to have a shorter system length of the optical imaging lens, a reduced f-number, a larger field of view, better imaging quality or a better fabrication yield to overcome the drawbacks of prior art.

In addition to the above ratios, one or more conditional formulae may be optionally combined to be used in the embodiments of the present invention and the present invention is not limit to this. The concave or convex configuration of each lens element or multiple lens elements may be fine-tuned to enhance the performance or the resolution. The above limitations may be selectively combined in the embodiments without causing inconsistency.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or AB or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object side to an image side in order along an optical axis comprising: a first lens element, a second lens element, a third lens element, a fourth lens element, a fifth lens element, a sixth lens element, a seventh lens element and an eight lens element, the first lens element to the eighth lens element each having an object-side surface facing toward the object side and allowing imaging rays to pass through as well as an image-side surface facing toward the image side and allowing the imaging rays to pass through, wherein:

the third lens element has negative refracting power, and a periphery region of the object-side surface of the third lens element is concave;

an optical axis region of the image-side surface of the fourth lens element is convex;

the sixth lens element has negative refracting power, and an optical axis region of the object-side surface of the sixth lens element is convex;

the seventh lens element has positive refracting power;

wherein lens elements included by the optical imaging lens are only the eight lens elements described above, and wherein the optical imaging lens satisfies the relationship: $|V2-V3| \leq 5.000$, $D12/(G45+G67) \leq 3.000$ and $(T1+G34+T8)/BFL \leq 1.700$, wherein V2 is an Abbe number of the second lens element, V3 is an Abbe number of the third lens element, D12 is a distance from the object-side surface of the first lens element to the image-side surface of the second lens element along the optical axis, G34 is an air gap between the third lens element and the fourth lens element along the optical axis, G45 is an air gap between the fourth lens element and the fifth lens element along the optical axis, G67 is an air gap between the sixth lens element and the seventh lens element along the optical axis, T1 is a thickness of the first lens element along the optical axis, T8 is a thickness of the eighth lens element along the optical axis, BFL is a distance from the image-side surface of the eighth lens element to an image plane along the optical axis.

2. The optical imaging lens of claim 1, wherein T7 is a thickness of the seventh lens element along the optical axis, T8 is a thickness of the eighth lens element along the optical axis, G34 is an air gap between the third lens element and the fourth lens element along the optical axis, and the optical imaging lens satisfies the relationship: $(G45+T7)/(G34+T8) \geq 1.800$.

3. The optical imaging lens of claim 1, wherein T8 is a thickness of the eighth lens element along the optical axis, G12 is an air gap between the first lens element and the second lens element along the optical axis, G78 is an air gap between the seventh lens element and the eighth lens element along the optical axis, and the optical imaging lens satisfies the relationship: $(G78+T8)/(G12+G67) \leq 6.000$.

4. The optical imaging lens of claim 1, wherein TL is a distance from the object-side surface of the first lens element to the image-side surface of the eighth lens element along the optical axis, EFL is an effective focal length of the optical imaging lens, Fno is a f-number of the optical imaging lens, and the optical imaging lens satisfies the relationship: $(TL+EFL)/Fno \geq 6.400$ mm.

5. The optical imaging lens of claim 1, wherein AAG is a sum of seven air gaps from the first lens element to the eighth lens element along the optical axis, T8 is a thickness of the eighth lens element along the optical axis, and the optical imaging lens satisfies the relationship: $AAG/T8 \geq 4.200$.

6. The optical imaging lens of claim 1, wherein T3 is a thickness of the third lens element along the optical axis, G23 is an air gap between the second lens element and the third lens element along the optical axis, ALT is a sum of thicknesses of all the eight lens elements along the optical axis, and the optical imaging lens satisfies the relationship: $ALT/(G23+T3) \geq 5.000$.

7. The optical imaging lens of claim 1, wherein Gmax is a maximum air gaps from the first lens element to the eighth lens element along the optical axis, Tmin is a minimum thickness from the first lens element to the eighth lens element along the optical axis, and the optical imaging lens satisfies the relationship: $Gmax/Tmin \geq 2.700$.

8. The optical imaging lens of claim 1, wherein:
an optical axis region of the image-side surface of the first lens element is concave;
a periphery region of the object-side surface of the seventh lens element is concave.

9. The optical imaging lens of claim 1, wherein T1 is a thickness of the first lens element along the optical axis, T4 is a thickness of the fourth lens element along the optical axis, T5 is a thickness of the fifth lens element along the optical axis, G56 is an air gap between the fifth lens element and the sixth lens element along the optical axis, and the optical imaging lens satisfies the relationship: $(T1+T4)/(T5+G56) \geq 1.850$.

10. The optical imaging lens of claim 1, wherein T3 is a thickness of the third lens element along the optical axis, G12 is an air gap between the first lens element and the second lens element along the optical axis, G34 is an air gap between the third lens element and the fourth lens element along the optical axis, TL is a distance from the object-side surface of the first lens element to the image-side surface of the eighth lens element along the optical axis, and the optical imaging lens satisfies the relationship: $TL/(G12+T3+G34) \geq 12.600$.

11. The optical imaging lens of claim 1, wherein TTL is a distance from the object-side surface of the first lens element to an image plane along the optical axis, Fno is a f-number of the optical imaging lens, and the optical imaging lens satisfies the relationship: $TTL/Fno \geq 3.900$ mm.

12. The optical imaging lens of claim 1, wherein AAG is a sum of seven air gaps from the first lens element to the eighth lens element along the optical axis, Tmin is a minimum thickness from the first lens element to the eighth lens element along the optical axis, and the optical imaging lens satisfies the relationship: $AAG/Tmin \geq 9.000$.

13. The optical imaging lens of claim 1, wherein ALT is a sum of thicknesses of all the eight lens elements along the optical axis, Gmax is a maximum air gaps from the first lens element to the eighth lens element along the optical axis, Tmin is a minimum thickness from the first lens element to the eighth lens element along the optical axis, and the optical imaging lens satisfies the relationship: $ALT/(Tmin+Gmax) \leq 4.500$.

14. The optical imaging lens of claim 1, wherein:
a periphery region of the object-side surface of the fourth lens element is concave;
an optical axis region of the image-side surface of the seventh lens element is convex.

15. The optical imaging lens of claim 1, wherein T2 is a thickness of the second lens element along the optical axis, G68 is a distance from the image-side surface of the sixth lens element to the object-side surface of the eighth lens element along the optical axis, and the optical imaging lens satisfies the relationship: $G68/T2 \geq 5.400$.

16. The optical imaging lens of claim 1, wherein BFL is a distance from the image-side surface of the eighth lens element to an image plane along the optical axis, EFL is an effective focal length of the optical imaging lens, Fno is a f-number of the optical imaging lens, and the optical imaging lens satisfies the relationship: $(EFL+BFL)/Fno \geq 3.600$ mm.

17. The optical imaging lens of claim 1, wherein ImgH is an image height of the optical imaging lens, Fno is a f-number of the optical imaging lens, and the optical imaging lens satisfies the relationship: ImgH/Fno≥2.900 mm.

18. The optical imaging lens of claim 1, wherein AAG is a sum of seven air gaps from the first lens element to the eighth lens element along the optical axis, T5 is a thickness of the fifth lens element along the optical axis, T6 is a thickness of the sixth lens element along the optical axis, G56 is an air gap between the fifth lens element and the sixth lens element along the optical axis, and the optical imaging lens satisfies the relationship: AAG/(T5+G56+T6)≤3.300.

19. The optical imaging lens of claim 1, wherein TTL is a distance from the object-side surface of the first lens element to an image plane along the optical axis, Gmax is a maximum air gaps from the first lens element to the eighth lens element along the optical axis, Tmin is a minimum thickness from the first lens element to the eighth lens element along the optical axis, and the optical imaging lens satisfies the relationship: TTL/(Tmin+Gmax)≤7.500.

\* \* \* \* \*